(12) United States Patent
Masaki et al.

(10) Patent No.: US 10,410,634 B2
(45) Date of Patent: Sep. 10, 2019

(54) EAR-BORNE AUDIO DEVICE CONVERSATION RECORDING AND COMPRESSED DATA TRANSMISSION

(71) Applicant: SmartEar, Inc., San Francisco, CA (US)

(72) Inventors: Kinuko Masaki, San Francisco, CA (US); Richard Ling, Las Vegas, NV (US)

(73) Assignee: SmartEar, Inc., San Francisco, CA (US)

( * ) Notice: Subject to any disclaimer, the term of this patent is extended or adjusted under 35 U.S.C. 154(b) by 0 days.

(21) Appl. No.: 15/981,917

(22) Filed: May 17, 2018

(65) Prior Publication Data

US 2018/0336901 A1 Nov. 22, 2018

Related U.S. Application Data

(60) Provisional application No. 62/508,378, filed on May 18, 2017.

(51) Int. Cl.
*G10L 15/26* (2006.01)
*H04R 1/08* (2006.01)
(Continued)

(52) U.S. Cl.
CPC .............. *G10L 15/265* (2013.01); *H04R 1/08* (2013.01); *H04R 1/1016* (2013.01); *G10L 15/30* (2013.01);
(Continued)

(58) Field of Classification Search
CPC ......... G10L 15/265; G10L 15/30; H04R 1/08; H04R 1/1016; H04R 5/027; H04R 2201/107; H04R 2420/07
(Continued)

(56) References Cited

U.S. PATENT DOCUMENTS 1,852,130 A 4/1932 Schier
1,893,143 A 1/1933 Henry
(Continued)

FOREIGN PATENT DOCUMENTS

WO WO2014/138735 A1 9/2014

OTHER PUBLICATIONS

International Search Report for PCT/US15/57998, and International Written Opinion for PCT/US15/57988, dated Apr. 29, 2016, 15 pages.
(Continued)

*Primary Examiner* — Binh Kien Tieu
(74) *Attorney, Agent, or Firm* — AWA Sweden AB; Thomas L. Ewing

(57) ABSTRACT

An embodiment of the invention provides a wireless ear-borne audio device that may be configured in a variety of ways, including, but in no way limited to a device for recording audio information and storing the audio information for later replay, and/or forwarding the audio information to another device. The audio information may be analyzed to perform further functions. An embodiment of the invention also provides a method for compressing audio data and transmitting the audio information to the ear-borne audio device in a manner that reduces the power consumption of the ear-borne audio device in receiving data via a Bluetooth® connection.

20 Claims, 7 Drawing Sheets

(51) Int. Cl.
  *H04R 1/10* (2006.01)
  *H04R 5/027* (2006.01)
  *G10L 15/30* (2013.01)
(52) U.S. Cl.
  CPC ........ *H04R 5/027* (2013.01); *H04R 2201/107* (2013.01); *H04R 2420/07* (2013.01)
(58) Field of Classification Search
  USPC ... 381/58, 315, 328, 330, 91, 110, 132, 367, 381/376
  See application file for complete search history.

(56) References Cited

U.S. PATENT DOCUMENTS

| | | | |
|---|---|---|---|
| 2,248,837 A | 7/1941 | Walters | |
| 2,619,960 A | 12/1952 | Reynolds | |
| 2,678,973 A | 5/1954 | Newman | |
| 2,754,365 A | 7/1956 | Walters | |
| 2,971,065 A | 2/1961 | Busse | |
| 2,984,726 A | 5/1961 | Roeser | |
| 3,282,106 A | 11/1966 | Bowling | |
| 3,815,583 A | 6/1974 | Scheidt | |
| 3,983,336 A | 9/1976 | Malek | |
| 4,069,400 A | 1/1978 | Johanson | |
| 4,133,984 A | 1/1979 | Akiyama | |
| 4,349,083 A | 9/1982 | Bennett | |
| 4,359,708 A | 11/1982 | Jarosz | |
| 4,539,708 A | 9/1985 | Norris | |
| 4,550,227 A | 10/1985 | Topholm | |
| 5,031,219 A | 7/1991 | Ward et al. | |
| 5,159,936 A | 11/1992 | Yelderman | |
| 5,167,235 A | 12/1992 | Seacord | |
| 5,626,139 A | 5/1997 | Szeles | |
| 5,654,530 A | 8/1997 | Sauer | |
| 5,812,680 A | 9/1998 | Glendon | |
| 6,358,281 B1 | 3/2002 | Berrang | |
| 6,648,914 B2 | 11/2003 | Berrang | |
| 6,920,229 B2 | 7/2005 | Boesen | |
| 7,120,267 B2 | 10/2006 | Ito | |
| 7,548,851 B1* | 6/2009 | Lau | G11B 20/00007 704/201 |
| 8,275,166 B2 | 9/2012 | Wu | |
| 8,389,862 B2 | 3/2013 | Arora | |
| 8,634,918 B2 | 1/2014 | Chambers | |
| 8,798,298 B1 | 8/2014 | Burns | |
| 8,855,345 B2 | 10/2014 | Shennib | |
| 8,983,108 B2 | 3/2015 | Ho | |
| 9,078,070 B2 | 7/2015 | Samuels | |
| 9,456,285 B2 | 9/2016 | Bymaster | |
| 9,571,913 B2 | 2/2017 | Masaki | |
| 2002/0181336 A1 | 12/2002 | Shields | |
| 2003/0027606 A1 | 2/2003 | Tsai | |
| 2003/0195588 A1 | 10/2003 | Fischell | |
| 2004/0224717 A1 | 11/2004 | Hertzberg | |
| 2004/0243204 A1 | 12/2004 | Maghribi | |
| 2004/0267388 A1* | 12/2004 | Perdon | G11B 27/005 700/94 |
| 2006/0045304 A1 | 3/2006 | Lee | |
| 2006/0098833 A1 | 5/2006 | Juneau | |
| 2007/0154030 A1 | 7/2007 | Moses | |
| 2007/0154049 A1 | 7/2007 | Levitsky | |
| 2008/0063231 A1 | 3/2008 | Juneau | |
| 2008/0130906 A1* | 6/2008 | Goldstein | A61B 5/121 381/58 |
| 2008/0152167 A1 | 6/2008 | Taenzer | |
| 2008/0253583 A1 | 10/2008 | Goldstein | |
| 2009/0010456 A1 | 1/2009 | Goldstein | |
| 2009/0034775 A1 | 2/2009 | Burton | |
| 2009/0052702 A1 | 2/2009 | Murphy | |
| 2009/0143096 A1 | 6/2009 | Chang | |
| 2009/0285437 A1 | 11/2009 | Takigawa et al. | |
| 2010/0002402 A1 | 1/2010 | Rogers | |
| 2010/0294285 A1 | 11/2010 | Turdjian | |
| 2011/0002498 A1 | 1/2011 | Wong | |
| 2011/0300806 A1 | 8/2011 | Lindahl | |
| 2011/0224493 A1 | 9/2011 | Oyadiran | |
| 2011/0237295 A1 | 9/2011 | Bartkowiak | |
| 2011/0264447 A1 | 10/2011 | Visser | |
| 2012/0114160 A1 | 5/2012 | Lin | |
| 2012/0300965 A1 | 11/2012 | Samuels | |
| 2013/0142363 A1 | 6/2013 | Amento | |
| 2013/0196721 A1* | 8/2013 | Waterman | H04M 1/05 455/575.2 |
| 2014/0112520 A1 | 4/2014 | Knudsen | |
| 2014/0153761 A1 | 6/2014 | Shennib et al. | |
| 2014/0153762 A1 | 6/2014 | Shennib et al. | |
| 2014/0169599 A1 | 6/2014 | Solum | |
| 2014/0172042 A1 | 6/2014 | Goorevich | |
| 2014/0301561 A1 | 10/2014 | Silberman | |
| 2014/0303452 A1 | 10/2014 | Ghaffari | |
| 2015/0110313 A1 | 4/2015 | Feilner | |
| 2015/0183167 A1 | 7/2015 | Molinari | |
| 2015/0230022 A1 | 8/2015 | Sakai | |
| 2015/0261298 A1 | 9/2015 | Li | |
| 2015/0281861 A1 | 10/2015 | Karamuk | |
| 2016/0049074 A1 | 2/2016 | Shennib | |
| 2016/0057550 A1 | 2/2016 | Shennib | |
| 2016/0162256 A1 | 6/2016 | Komaromi | |
| 2016/0192050 A1 | 6/2016 | Masaki | |
| 2016/0206000 A1 | 7/2016 | Lord | |
| 2016/0247380 A1 | 8/2016 | Kumar | |
| 2017/0103745 A1* | 4/2017 | Baker | H04R 1/1083 |
| 2017/0195791 A1* | 7/2017 | Pedersen | H04R 1/10 |
| 2017/0262698 A1 | 9/2017 | Hoffman | |
| 2018/0124517 A1* | 5/2018 | Khaira | B23P 19/04 |
| 2018/0152781 A1* | 5/2018 | Boyer | H03G 3/02 |
| 2019/0086508 A1* | 3/2019 | Isberg | G01S 5/0257 |
| 2019/0116430 A1* | 4/2019 | Schnell | H04R 1/1083 |

OTHER PUBLICATIONS

"Wireless Headphones | Koss Striva Tap Wi-Fi Earbuds" by Mila Pantovich Jun. 8, 2012, JustLuxe, pp. 1-3, http://www.justluxe.com/lifestyle/electronics/feature-1780526.php (retrieved Apr. 16, 2017).
"Here Active Listening earbuds: Augmented reality for your ears (hands-on)" by Will Shanklin, Jan. 13, 2016, pp. 1-4, http://newatlas.com/doppler-labs-here-earbuds-hands-on/41322/ (retrieved Apr. 16, 2017).
Nap Zapper Anti-Sleep Alarm, Amazon, pp. 1-6, https://www.amazon.com/Generic-Nap-Zapper-Anti-Sleep-Alarm/dp/B000BK4KW8 (retrieved Apr. 16, 2017).
International Search Report for PCT/US18/53249, and International Written Opinion for PCT/US18/53249, dated Nov. 20, 2018, 20 pages.

* cited by examiner

EAR-BORNE AUDIO DEVICE CONVERSATION RECORDING AND COMPRESSED DATA TRANSMISSION

CROSS-REFERENCE TO RELATED APPLICATIONS

The present application is related to U.S. patent application Ser. No. 15/163,843, entitled "In-Ear Utility Device Having Tap Detector," U.S. patent application Ser. No. 15/163,873 entitled "In-Ear Utility Device Having Dual Microphones," U.S. patent application Ser. No. 15/163,891 entitled "In-Ear Utility Device Having Sensors," U.S. patent application Ser. No. 15/163,908 entitled "In-Ear Utility Device Having A Humidity Sensor," U.S. patent application Ser. No. 15/163,931 entitled "In-Ear Utility Device Having Information Sharing," and U.S. patent application Ser. No. 15/163,949 entitled "In-Ear Utility Device Having Voice Recognition" which are assigned to the assignee of the present application. These related applications are incorporated herein by reference in their entirety.

FIELD

Embodiments of the invention relate to systems and methods pertaining to ear-borne audio devices. More particularly, an embodiment of the invention relates to systems and methods that employ in-ear electronics to provide a wireless ear-borne audio device that rests in the user's ear canal and has been configured to record audio data in the user's environment and communicate wirelessly with remote devices.

BACKGROUND

The following discussion includes information that may be useful in understanding embodiments of the invention. It is not an admission that any of the information provided herein is prior art or relevant to the present invention, or that any publication specifically or implicitly referenced is prior art.

With the development of portable multimedia devices and smart phones, many types of ear pieces, such as earphones and headsets, have been developed and used. However, previous ear pieces have traditionally been bulky and uncomfortable as well as being limited in their technological abilities. Thus, the prospects for exploring new form factors for ear pieces have conventionally been limited.

Moreover, these ear pieces have conventionally been devices slaved to other devices, such as smartphones, with limited abilities to operate independently. Similarly, the prospects for exploring new and independent uses for ear pieces have also been limited conventionally.

In addition, conventional ear pieces have not been viewed as one element of a comprehensive system that provides various user services. Furthermore, communications between such devices and external devices have tended not to be conscious of power consumption consumed during transmission.

Therefore, a need exists for more advanced ear-borne audio devices that can perform an expanded set of tasks at an improved rate of performance over the devices found in the prior art.

SUMMARY OF THE INVENTION

Embodiments of the invention include a wireless ear-borne audio system that comprises a body having a first portion configured to connect to a user's ear and having a second portion that provides a speaker directed towards the user's ear, such that the user hears sounds from the speaker. A microphone attached to the body detects ambient sounds near the user and converts the ambient sounds to a digital signal. A first processor receives the digital signal from the microphone; a data repository configured to receive the digital signal from the first processor, wherein the first processor directs the data repository to store the received digital signal as a plurality of predetermined audio segments, each audio segment corresponding to a predetermined length of time. The first processor operates storage of the received digital signal in a loop, such that the first processor directs the data repository to overwrite a previously stored predetermined audio segment of the plurality of predetermined audio segments when a number of predetermined audio segments reaches a predetermined audio segment number. A user-engaged actuator sends a signal to the first processor to play a first predetermined audio segment of the plurality of audio segments through the speaker, wherein the first processor locates the first predetermined audio segment and directs the speaker to play the first predetermined audio segment.

BRIEF DESCRIPTION OF THE DRAWINGS

Figures provided herein may or may not be provided to scale. The relative dimensions or proportions may vary. Embodiments of the invention may be sized to fit within an ear canal of a user.

DETAILED DESCRIPTION OF AN EMBODIMENT OF THE INVENTION

Figure 1A:
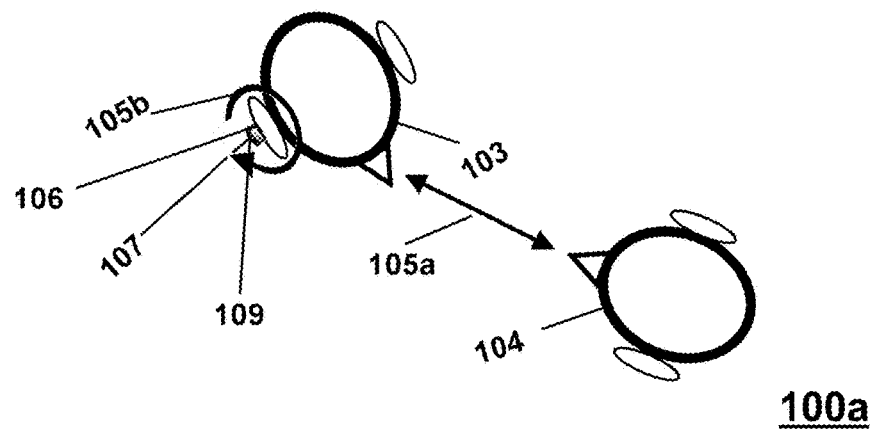
FIG. 1A illustrates an embodiment of the invention where a user can engage the replay of a stored audio segment 105b on an ear-borne audio device 107, according to an embodiment of the invention.

Embodiments of the invention provide enhancements to a variety of ear-borne audio devices, including but not limited to in-ear utility devices. An ear-borne audio device comprises an audio device that connects to a user's ear and provides various audio services to a user. An ear-borne audio device typically includes a plurality of components, such as a microphone for capturing ambient sounds near the user, a speaker for playing sounds to the user, and a communication module for sending and receiving wireless transmissions to remote devices. The ear-borne audio device can be configured to provide users with a host of services. An in-ear utility device is a type of ear-borne audio device that resides in a user's ear canal. Embodiments of the invention will be described herein in the context of its embodiment in an in-ear utility device but other embodiments of the invention are amenable for application with other forms of ear-borne audio devices, e.g., ear-borne devices need not reside in the user's canal but may be attached to the user's ear, such as headphones and earbuds. Ear-borne audio devices may be configured into larger networks of wireless ear-borne systems that include other components such as remote data processing and analysis systems for carrying out a variety of functions, such as processes too computationally complex to be performed by the processors found in conventional ear-borne audio devices.

Embodiments of the invention include an ear-borne audio device having a mechanism that allows users to record and re-play a portion of the audio received in the user's ear-borne audio device from an earlier time interval (e.g., the last 30 seconds of a conversation with a business colleague). Thus, the user may be able to save portions of the audio received in the user's ear-borne audio device for subsequent replay (e.g., a police officer recalling a suspect's answer to a question asked a few seconds earlier). In some embodiments of the invention, the user may engage transmission of saved audio clips from the user's ear-borne audio device to another device (e.g., an audio recording of a manager's instructions to his subordinate received in an ear-borne audio device may be sent to the subordinate's computer so that he can study the instructions and follow them carefully.)

A user may also instruct that saved audio clips from an ear-borne audio device be processed by a remote analysis device to obtain a given result, e.g., to extract the meaning from a saved audio clip and send it to the user (or another party) in another medium, according to an embodiment of the invention. For example, the user might request that the audio clip be analyzed and turned into a written transcript that could be printed. Similarly, the user could instruct that information (e.g., instructions) in a saved audio clip be processed by a remote analysis device to determine its meaning and acted upon (e.g., an audio clip from a user away from home containing the instructions, "Lock front door and turn on the outside lights" could be processed by a remote analysis unit so as to create the instructions for engaging the locking of an office door and turning on outside lighting and transmit the instructions to the unit that could engage the requested actions (e.g., locking the door and turning on the lights).

Embodiments of the invention may also include devices and procedures that reduce electrical power consumption by an ear-borne audio device's batteries (e.g., an in-ear utility device's battery(ies). An ear-borne audio device and another device (e.g., a Bluetooth® enabled smartphone) may each be configured to send files (e.g., audio data files) using a rapid burst of highly compressed files, as opposed to the conventional method of sending data files in a streaming manner that consumes more battery power than a rapid, short duration compressed transmission. For example, in a Bluetooth® environment, this would mean that the power-sensitive Bluetooth® device was active for a shorter period of time, thus saving power.

FIG. 1A illustrates an embodiment of the invention where a user can engage the replay of an audio segment 105b stored on an ear-borne audio device 107 through a speaker 106 on the ear-borne audio device, according to an embodiment of the invention. The audio segment 105b is a portion of an audio conversation 105a.

As shown in FIG. 1A, a user 103 engages in a conversation 105a with another person 104. The ear-borne audio device 107 has been configured to continuously record a predetermined duration of audio (e.g., every 30 second increment of the conversation 105a) received by a microphone 109 (e.g., microphone 303 in FIG. 3A) in the ear-borne audio device 107. The conversation 105a comprises a series of ambient sounds detected by the microphone 109 and converted by the microphone 109 into a digital signal. The microphone 109 may employ additional hardware to convert the conversation 105a into a digital signal. A processor (e.g., the processor 307 in FIG. 3A) in the ear-bone audio device 107 may be configured to store all received audio in the form of a digital signal from the microphone 109 or may be configured to store all received audio from the microphone 109 in the form of a digital signal for a given time duration (e.g., 30 seconds) and then begin recording over (e.g., overwriting) the earliest stored audio segment (e.g., audio storage operating in a loop). The audio segments 105b may be stored in a data repository such as data storage component 309 shown in FIG. 3.

The user 103 may engage the storing of an audio segment 105b from the conversation 105a in the ear-borne audio device 107. The user 103 may then replay the stored audio segment 105b to the user via the speaker 106 (e.g., the speaker 208 shown in FIG. 2 and/or the speaker 308 shown in FIG. 3) at a later period. Thus, the user 103 may have a number of stored audio segments 105b in the ear-borne audio device 107. The ear-borne audio device 107 may have a limit (e.g., a predetermined audio segment number of three) to the number of stored audio segments 105b which can be stored on the ear-borne audio device 107 before new segments are recorded over old ones and/or deleted in the looping process.

The user accesses a user-engaged actuator to engage the replaying of a stored audio segment. The user also accesses a user-engaged actuator (e.g., the same actuator for replay or possibly a different actuator) to engage the functionality that carries out the audio recording, according to an embodiment of the invention. The user-engaged actuator for replay and/or recording may comprise a user interface (e.g., several types of user interfaces are possible) to engage the functionality that carries out the audio segments 105b, according to an embodiment of the invention. The user may, for example, engage a program on a device such as a smartphone in communication with the ear-borne audio device 107. The ear-borne audio device 107 could include a touch-activated actuator that serves as the user-engaged actuator for engaging replay of an audio segment 105a as well as storage of the audio segments 105b. In addition, the ear-borne audio device 107 may include a tap-based user interface, such as the tap-based user interface discussed in FIG. 3A, that serves as the user-engaged actuator for engaging replay of an audio segment 105b and for engaging storage of the audio segments 105b, according to an embodiment of the invention.

The user-engaged actuator for engaging replay and/or recording of audio segments 105b may also comprise natural language processing carried out the processor in the ear-borne audio device that has been configured to recognize one of more user configurable triggers, such as phrases for engaging recording of the audio segments 105b. For example, the processor's natural language processing might recognize a phrase like "now that's really interesting" that causes the processor to engage storing of the audio segments 105b, according to an embodiment of the invention. The user may provide a new trigger for the processor by, for example, using the microphone 107 to record a new trigger which the processor stores in the data repository. Similarly, the user could provide a user configurable disengagement trigger, such as "okay, that's a wrap" that causes the processor to stop storing audio segments 105b. Conventional natural language processing can be configured by an ordinary artisan in the speech processing field to perform such processing.

Figure 1B:
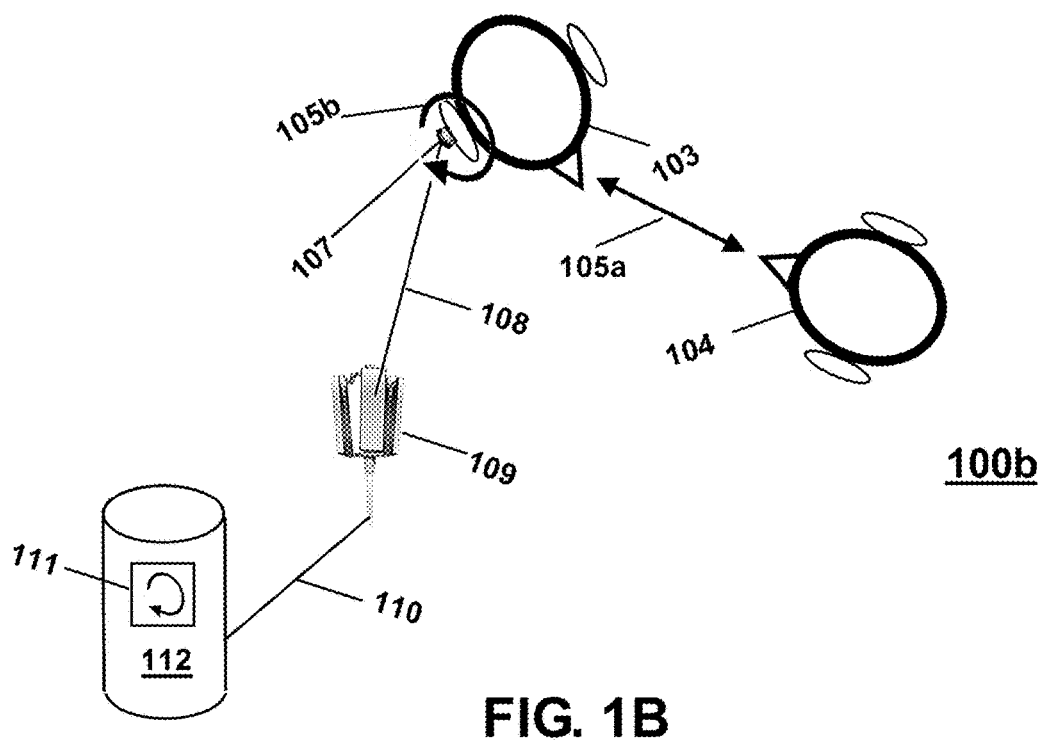
FIG. 1B illustrates an embodiment of the invention in which the user 103 directs transmission of the stored audio segment 105b to an external storage device 112, according to an embodiment of the invention.

FIG. 1B illustrates an embodiment of the invention in which the user 103 directs transmission of the stored audio segment 105b to an external storage device 112, according to an embodiment of the invention. The user 103 may have previously stored the audio segment 105b in the manner described in FIG. 1A.

The user 103 may engage the transmission of the stored audio segment 105b to a remote storage device 112. The ear-borne audio device 107 includes a wireless transmitter (e.g., communications module 304 shown in FIG. 3A). The stored audio segment 105b may be wirelessly transmitted 108 to a remote device 109 (e.g., a mobile phone or cell tower) that then transmits 110 the stored audio segment 105b to the remote storage device 112, where the audio segment 105b is stored as audio segment 111. The ear-borne audio device 107 may transmit directly to a distant device, such as the remote storage device 112 if it includes a sufficiently powerful transceiver, or the ear-borne audio device 107 may transmit to an intermediate device such as a smartphone or a cell tower (as shown).

The user 103 (or others) may replay the stored audio segment 111 and perhaps replay the stored audio segment 111 on a device other than the ear-borne audio device 107, according to an embodiment of the invention.

In some embodiments of the invention, the user may instruct that the entire conversation 105a be transmitted to the remote storage device 112. In some embodiments of the invention, the conversation 105a may be streamed to the remote storage device 112.

Embodiments of the invention may have interoperability with a variety of user interfaces to enable the user to engage the functionality for transmitting the audio segment 105b to the remote storage device 112. The user interface could comprise a graphical user interface on a related device (e.g., a smartphone), a mechanical button on the ear-borne audio device 107, or a tap-based interface, such as the tap-based user interface described in conjunction with FIGS. 3A-3B.

Figure 1C:
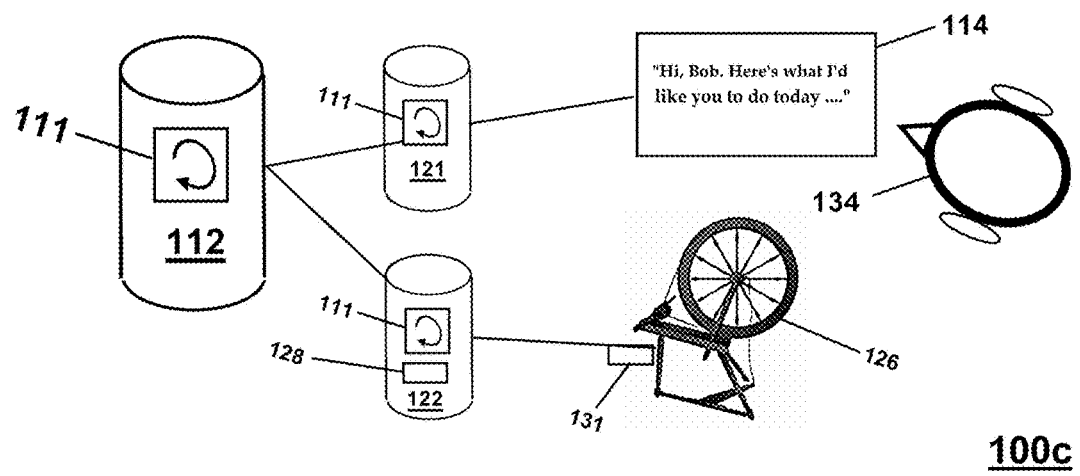
FIG. 1C illustrates an embodiment of the invention in which a stored audio segment 111 (e.g., a conversation stored as shown in FIGS. 1A-1B) can be analyzed to engage an action, according to an embodiment of the invention.

FIG. 1C illustrates an embodiment of the invention in which a stored audio segment 111 (e.g., an audio segment 105b stored as shown in FIGS. 1A-1B) can be analyzed to engage an action, according to an embodiment of the invention.

FIG. 1C illustrates the engagement of two separate actions shown by remote analysis devices 121, 122, according to an embodiment of the invention, although there is no necessity that multiple actions be engaged by the user. In addition, the user need not necessarily employ a separate remote analysis device to carry out these functions, which could likely be performed on a single server, e.g., the server 112. The depiction of two remote analysis devices 121, 122 here is provided as a convenience of explanation rather than a technical necessity. Each remote analysis device includes a processor configured to perform the functions described in order carryout a transformation of the stored audio segment 111, according to an embodiment of the invention.

In a first action on remote analysis device 121, the user (or another party) would like the stored audio segment 111 analyzed to construct a transcript of the stored audio segment 111. The remote analysis device 121 analyzes the stored audio segment 111 to produce a transcript 114. Conventional audio-to-speech technologies maybe employed to produce transcript 114. The transcript 114 may then be reviewed by a user 134 who need not necessarily be the user 103 shown in FIG. 1A, according to an embodiment of the invention. The transcript 114 may be stored in the remote server 112.

The user employs natural language processing to request the transcript 114 be sent once it has been analyzed by the remote analysis device 121. In other words, the user may say something like "Tell Capt. Riley to send extra security to Zone 1. Urgent." The stored audio segment 111 is "Tell Capt. Riley to send extra security to Zone 1. Urgent." The natural language processing may recognize "Capt. Riley" as the message recipient, and "send extra security to Zone 1" as the clipped message, and "Urgent" as a predefined message priority. Thus, in this example, the transcript 114 sent to Capt. Riley will be an urgent text message that states "Send extra security to Zone 1."

In a second action on the remote analysis device 122, the user would like the stored audio segment 111 analyzed to provide instructions for engaging a particular command on a machine 126. The server 116 analyzes the stored audio segment 111 to construct a text command 128 (e.g., instructions for engaging and completing a given task on the machine 126). Conventional audio-to-text processes may be followed and may possibly be enhanced by converting text into the specific instructions 128 used to control the machine 126 (e.g., machine language for the particular machine). In other words, the text command 128 may be machine-operable instructions for the machine 126. The machine 126 could be any machine (e.g. an electro-mechanical spinning wheel a light switch, a door lock, etc.). The server 116 provides the text command 128 to a control mechanism 131 for the machine 126 that then engages and completes the instructions 128, according to an embodiment of the invention.

Figure 1D:
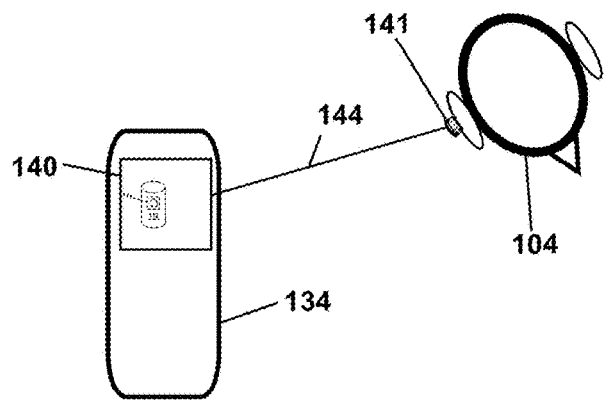
FIG. 1D illustrates an embodiment of the invention in which a compressed audio file 140 is transmitted in a short-duration burst 144 to an ear-borne audio device 104 from an audio storage device 134 (e.g., a smartphone) via a wireless transceiver (e.g., the communications module 304 on the in-ear utility device 301, such as shown in FIG. 3A).
Figure 3A:
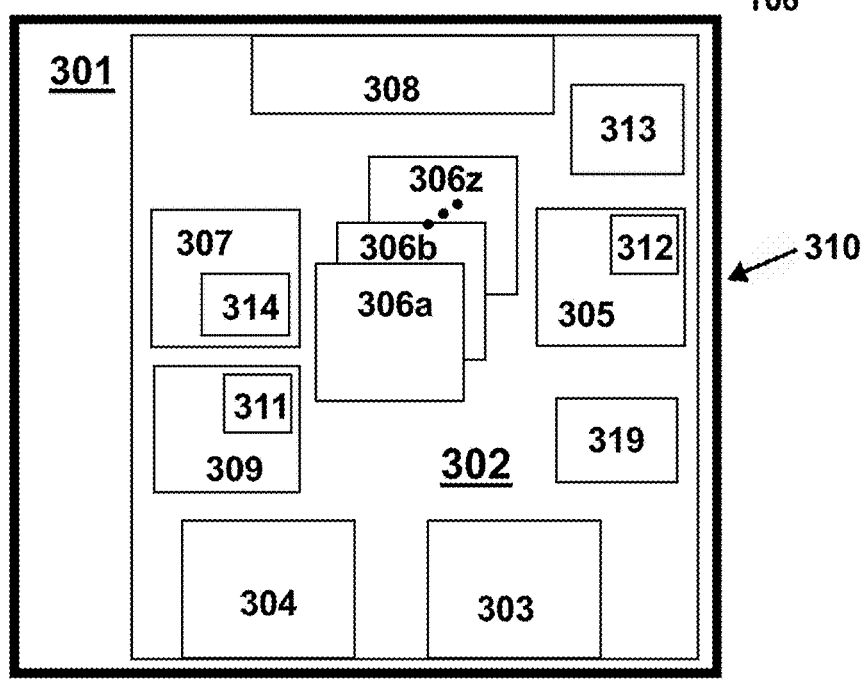
FIG. 3A provides a block diagram of an in-ear utility device 301, a type of ear-borne device, according to an embodiment of the invention.

FIG. 1D illustrates an embodiment of the invention in which a compressed audio file 140 is transmitted in a short-duration burst 144 to an ear-borne audio device 104 from an audio storage device 134 (e.g., a smartphone) via a wireless transceiver on the ear-borne audio device, such as the communications module 304 in the in-ear utility device 301 shown in FIG. 3A. The compressed audio file 140 comprises a highly dense data transmission to the ear-borne audio device 104. Once the highly dense data transmission has been completed, then the ear-borne audio device 104 may reduce electrical power consumption by the ear-borne audio device's batteries (e.g., the battery 313 shown in FIG. 3) by sending a battery conservation message to the processor that causes the processor to enter a lower power mode. The rapid burst of highly dense data transmission, as opposed to the conventional method of sending data files in a streaming manner that consumes less battery power. For example, in a Bluetooth® environment, this would mean that the power-sensitive Bluetooth® device was active for a shorter period of time, thus saving power.

Ear-borne audio devices may be used for various purposes and include a variety of electronic packages, including packages that facilitate performance of the inventions described herein. The electronic package (such as the electronic component package 302 shown in FIG. 3A) may serve a variety of functions, such as noise cancellation that allows the user to focus on sounds of interest, a health-monitoring tasks, and/or a fitness monitor, each embodiment having the sensors and electronic configuration needed to carry out its mission.

Embodiments of the wireless ear-borne audio device may include an electronic package that supports the Internet of Things (IoT), defined as a network of physical objects embedded with electronics, software, sensors, and network connectivity, which enables the collection and exchange data between the ear-borne audio device and other devices and/or the user. The Internet of Things allows objects to be sensed and controlled remotely across existing network infrastructure, allowing more direct integration between the physical world and computer-based systems.

Embodiments of the Invention Applied to an in-Ear Utility Device

While embodiments of the invention are amenable for application to an ear-borne audio device, the following sections describes application of an embodiment of the invention to an in-ear utility device, which is a type of ear-borne audio device, as discussed above.

Figure 2:
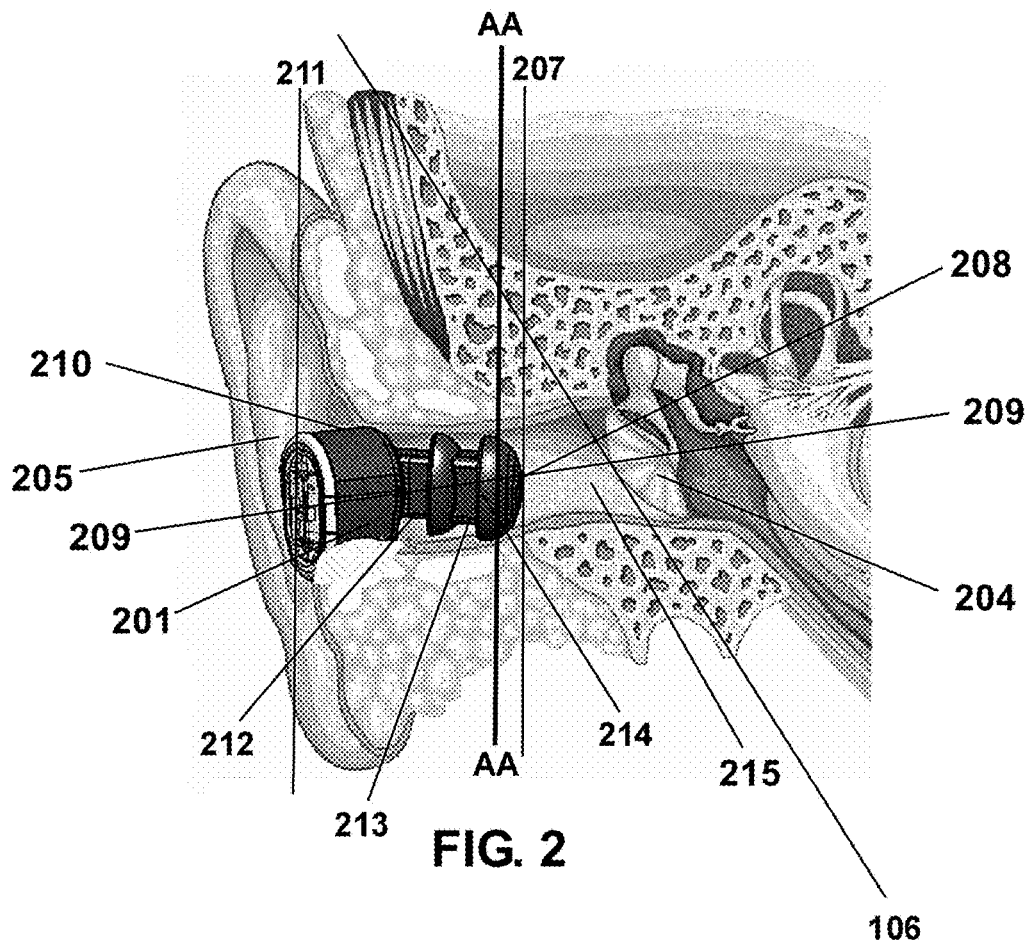
FIG. 2 illustrates a type of ear-borne audio device known as an in-ear utility device 201 that can be inserted into an ear 205, according to an embodiment of the invention.

FIG. 2 illustrates a type of ear-borne audio device known as an in-ear utility device 201 that can be inserted into an ear 205, according to an embodiment of the invention. The in-ear utility device 201 includes an electronics-package 213, such as the electronics component package 302 shown in FIG. 3A. Embodiments of the in-ear utility device 201 includes a speaker 208 disposed at the proximal tip 207 of the body of the in-ear utility device 201 and a microphone 210, disposed in the distal portion 211 of the in-ear utility device 201.

The in-ear utility device 201 may be configured to record audio data detected by the microphone 210. The recording function disclosed in FIG. 2 may be user engaged by the user. For example, the in-ear utility device 201 may record the audio data in a loop of a given duration (e.g., 30 seconds). The in-ear utility device 201 may also be configured to send portions of recorded audio data to a storage device having greater memory capacity than the storage device on the in-ear utility device 201 itself. The in-ear utility device 201 may take both actions, and the in-ear utility device 201 may be user configurable with respect to the specific actions taken, according to embodiments of the invention.

The in-ear utility device 201 comprises a body 212 having the longitudinal axis 209 extending between a distal end 211 and a proximal tip 207. The distal end 211 of the in-ear utility device 201 resides just outside the user's ear 205 so that the in-ear utility device 201 may be easily removed by hand, according to an embodiment of the invention. In some embodiments of the invention, the in-ear utility device 201 might reside inside the ear canal 215 with no part of the device outside the ear 205.

In some embodiments, the speaker 208 may contact the eardrum 204 or be in even closer proximity to the eardrum than indicated in FIG. 2. In some embodiments of the invention, the in-ear utility device 201 may reside in a broader range than 8 to 12 mm. from the user's eardrum 204, e.g., 3 mm. to 15 mm. The 8 to 12 mm. range, however, should provide improved sound quality to the user while also residing at a distance that does not require the employment of an audiologist to satisfy health and safety regulations.

An electronic component package 213 is fixed inside, mounted on, and/or embedded in or on the body 212 of the in-ear utility device 201 and includes electronic circuitry configured to allow the in-ear utility device 201 to record audio data, according to an embodiment of the invention. The electronic component package 213 includes a speaker 208 at its proximal end 207, according to an embodiment of the invention.

Some embodiments of the in-ear utility device 201 are designed to rest in the ear 205 between 8 to 12 mm. away from the user's tympanic membrane (eardrum) 204. Thus, the in-ear utility device 201 when placed properly in the ear canal 215 has a proximal tip 207 (along with the speaker 208) that lies from 8 to 12 mm. from the outer edge 206 of the eardrum 204 along a longitudinal axis 209, according to an embodiment of the invention. Studies have shown that the length of the typical human ear canal 215 varies from 27 mm to 35 mm measured along a curved center axis. Thus, embodiments of the in-ear utility device 201 reside well inside the ear canal 215.

Embodiments of the invention may be configured to work with earbuds, headphones, in-ear headphones, and other similar devices and need not be restriction to devices involving in-ear utility devices, such as the in-ear utility device 201 shown in FIG. 2. However, the in-ear utility device 201 provides a suitable platform for embodiments of the inventions described herein.

FIG. 3A provides a block diagram of an in-ear utility device 301, a type of ear-borne audio device, according to an embodiment of the invention. The in-ear utility device 301 is formed of a body 310 that contains an electronic component package 302. The specific configuration of the electronic component package 302 may vary from embodiment to embodiment of the in-ear utility device 301. In some embodiments, the in-ear utility device 301 may be on the order of about 5 mm. to 5 cm in length.

The electronic component package 302 may include one or more electronic components such as a microphone 303, a wireless communications module (e.g., transceiver) 304, an amplifier 305, a battery 313, a processor 307, a speaker 308, a voice recognition chip 314, a Hall Effect sensor 319, and a data storage component 309, various sensors 306a-306z, according to an embodiment of the invention.

The electronic component package 302 may include multiple copies of the same components, e.g., two microphones, either for backup purposes or to provide expanded capabilities. The individual components in the electronic component package 302 may be electrically coupled and/or wired as needed to provide conventional functionality for such components in a manner known to ordinarily skilled artisans, except when noted herein.

Microphone and Speaker

The microphone 303 may communicate audio data to the speaker 308. The microphone 303 may be in electronic and/or mechanical communication with the speaker 308. Sound/vibrations picked up by the microphone 303 may be transmitted to the speaker 308.

The microphone 303 does not need to communicate with the speaker 308, exclusively, or at all in various embodiments of the invention. The microphone 303 may be employed for tasks not directly connected with the speaker 308 and vice versa.

In conjunction with the ability to record conversations, such as shown in FIG. 1A, the microphone 303 communicates audio data to the processor 307, according to an embodiment of the invention. The processor 307 then directs the storage of the audio data in a data storage component 309. As discussed above, the audio data may be stored in a loop, such that the loop records over early portions of audio data at a fixed interval, e.g., every 30 seconds.

In some embodiments, the sound/vibrations picked up may be amplified via the amplifier 305 and transmitted to the speaker 308. In various embodiments, the amplifier 305 may include a digital signal processor (DSP) 312. In various embodiments of the invention, the DSP 312 may perform (or assist in) a number of functions, such as noise cancellation and speech recognition. The DSP 312 need not be co-located with the amplifier 305, according to embodiments of the invention. Thus, the audio data may also be communicated to the DSP 312, and/or the voice recognition chip 314, and/or other apparatus to determine the type of environment that the user is located in (e.g., dense urban area, barren wilderness, etc.) and allow the processor 307 to make an appropriate action, depending on the task(s) set for the in-ear utility device 301.

The microphone 303 may be a stronger microphone than typically found in hearing aid devices, in some embodiments of the invention. For example, the microphone may operate in the range of 80 Hz to 5000 KHz, a range not typically found in hearing aids. The microphone 303 at this range detects sounds at a much lower decibel range than the typical hearing aid and essentially detects a whole spectrum of human hearing, according to an embodiment of the invention.

Because the processor 307 and the microphone 303 may be more powerful than similar components found in hearing aids, the in-ear utility device 301 may need to remove white noise generated by the processor 307, especially given the more powerful microphone 303 while noise removal can be accomplished by means of an appropriate audio filter.

A typical hearing aid microphone also operates at a comparatively low voltage such as 1.2V in comparison to the more powerful microphone 303 that operates at 3.5 to 5V. Thus, the circuity inside the in-ear utility device 301 may also needs to filter out white noise generated by its powerful electrical components, according to an embodiment of the invention.

The speaker 308 may be a significantly smaller speaker than typically found in Bluetooth® devices. This smaller speaker 308 in combination with the smaller form factor of the body 310 allows the in-ear utility device 301 to penetrate farther into the user's ear canal than a Bluetooth® device, according to an embodiment of the invention.

In some embodiments, the distance between the speaker 308 and the microphone 303 may range between from 5 mm to 5 cm. As a general matter, the greater the distance between the microphone 303 and the speaker 308, the lower likelihood of feedback between the microphone 303 and the speaker 308. The speaker 308 and the microphone 303 may be placed closer together if feedback between the components can be nullified or compensated for, according to an embodiment of the invention.

In some embodiments, audio input to the speaker 308 may come from the wireless communications module 304, such as when the wireless communications module 304 is configured for Bluetooth® communications. Additionally, audio input to the speaker 308 may come from the data storage component 309 of the in-ear utility device 301. For example, playing stored music or instructions. These configurations may also include inputs from the microphone 303 but could occur without a microphone being included in the device.

For example, the processor 307 may receive compressed audio data (e.g., the compressed audio data shown in FIG. 1D) and then decompress the audio data in order for the audio data to be played to the user via the speaker 308, according to an embodiment of the invention.

Processor and Data Storage

In some embodiments, the in-ear utility device 301 includes a processor 307 which may be integral with the electronic component package 302 or operate under the control of a remote computing device (e.g., a mobile computing device) sending instructions via the communications module 304.

The processor 307 in the in-ear utility device 301 may access data and/or execute software applications 311, according to an embodiment of the invention. The data and software applications 311 may be stored in the data storage component 309 and/or delivered to the processor 307 via the communications module 304 from a remote storage device located away from the in-ear utility device 301. For example, the processor 307 might execute a software application that resides on a mobile phone linked to the in-ear utility device 301. A skilled artisan will appreciate that many software applications known in the art may be utilized by the processor 307. A variety of different data and software applications herein have been labeled 311, as an indication that the data and/or software applications are stored in the data storage component 309.

For example, the processor 307 may be configured with processor-executable instructions 311 to perform operations to distinguish meaningful sound, such as speech, from ambient noise, according to an embodiment of the invention. Such instructions may perform operations for receiving sound signals from the microphone 303, determining whether the sound signals represent meaningful sound, according to various criteria stored in the data storage component 309, providing the sounds to the speaker 308 when the sound signals represent meaningful sound, and filtering the sounds from the speaker 308 when the sound signals do not represent meaningful sound. Such instructions 311 for a speech detection program may be present in the data storage component 309 of the in-ear utility device 301 or a coupled external computing device.

The processor 307 may comprise a CPU, or a like computing device, or may alternatively comprise a simple circuit that directs the operations of the various components in the electronic component package 302, according to an embodiment of the invention. In embodiments in which the processor 307 comprises a simple control circuit, the other components in the electronic component package 302 may also be simple and/or few in number, e.g., just a battery 313, a data storage component 309, and a speaker 308, in addition to the processor 307.

In some embodiments, the processor 307 may be a significantly more powerful computing device than conventionally found in hearing aids. For example, the processor 307 might be a CSR8670 chip. CSR8670 is an audio system-on-chip (SoC) solution with wireless connectivity, embedded flash memory and integrated capacitive touch sensors. The CSR8670 includes noise cancellation and voice recognition capabilities. Thus, in some embodiments of the invention, the processor 307 may include some of the other components shown in FIG. 3A. In contrast, the typical completely-in-ear-canal (CIC) hearing aid (e.g., a hearing aid in the ear canal rather than behind the ear) uses an SB3229-E1 chip or similar processing chip, which has a slower speed and a smaller feature set than the processor 307. The processor 307 may require higher power than the typical hearing aid processor. The CSR8670 chip requires between 4V to 2.8V. The SB3229-E1 chip operates at much lower voltage, e.g., 1.2V. The CSR8670 chip operates at 20-34 milliamps while the SB3229-E1 chip operates in the micro-amps range. Thus, placing the processor 307 into the body 310 may require careful adjustment in order to operate properly, according to an embodiment of the invention. The filtering of white noise, for example, has already been mentioned.

The data storage component 309 may comprise a non-transitory memory, such as RAM, flash, ROM, hard drive, solid state, drive, optical media and the like. The data storage component 309 may include various types of data, such as media, music, software, and the like. For example, the data storage component 309 may include compressed audio files transmitted in a burst, according to an embodiment of the invention, such as that shown in FIG. 1D. The data storage component 309 may also be configured to hold stored audio communications between the user and others, e.g., the audio loop recording discussed and disclosed in FIGS. 1A and 1B, according to an embodiment of the invention.

The data storage component 309 may have a variety of sizes, e.g., 1 to 4 gigabytes, according to an embodiment of the invention. In-the-ear-canal (CIC) hearing aids, by comparison, typically have much smaller size memories. Integrating the data storage component 309 into the in-ear utility device 301 requires care to make sure that components function properly in the small form factor.

Wireless Communication Module

The wireless communications module 304 can be implemented using a combination of hardware (e.g., driver circuits, antennas, transceivers, modulators/demodulators, encoders/decoders, and other analog and/or digital signal processing circuits) and software components. Multiple different wireless communication protocols and associated hardware can be incorporated into the wireless communications module 304.

The wireless communications module 304 includes structural and functional components known in the art to facilitate wireless communication with another computing device or a remote network. The wireless communications module 304 can include RF transceiver components such as an antenna and supporting circuitry to enable data communication over a wireless medium, e.g., using Wi-Fi (IEEE 802.11 family standards), Bluetooth® (a family of standards promulgated by Bluetooth® SIG, Inc.), or other protocols for wireless data communication. In some embodiments, the wireless communications module 304 can implement a short-range sensor (e.g., Bluetooth®, BLE or ultra-wide band).

The wireless communications module 304 may be configured to receive highly condensed audio files, such as the compressed file "burst" disclosed in FIG. 1D, according to an embodiment of the invention. The transmissions of these bursts may be directed by the processor 307 and stored in the data storage component 309.

In some embodiments, the wireless communications module 304 can provide near-field communication ("NFC") capability, e.g., implementing the ISO/IEC 18092 standards or the like, NFC can support wireless data exchange between devices over a very short range (e.g., 20 centimeters or less). NFC typically involves a near field magnetic induction communication system that provides a short range wireless physical layer that communicates by coupling a tight, low-power, non-propagating magnetic field between devices. In such embodiments, the wireless communication module 304 may include a transmitter coil in the in-ear utility device 301 to modulate a magnetic field which is measured by means of a receiver coil in another device, e.g., another ear-borne audio device or a smartphone.

In some embodiments, the wireless communications module 304 can have an ultrasound transducer function, receiving ultrasound data communications and translating them into an electronic signal. Ultrasound communications may offer lower power than some other modes of wireless communications. The wireless communications module 304 may also be capable of translating an electronic signal into an ultrasound signal for transmission to another device, according to an embodiment of the invention.

In some embodiments of the invention, the in-ear utility device 301 can communicate bi-directionally via a network. In such embodiments, the wireless communications module 304 may comprise a Bluetooth® digital wireless protocol such that the in-ear utility device 301 may communicate with a remote computing device.

As discussed above, Bluetooth® technology provides a low-cost communication link. The Bluetooth® transceiver in an embodiment of the wireless communications module 304 may be configured to establish a wireless data link with a suitably equipped mobile computing device and/or another ear-borne audio device.

In an embodiment, the wireless communications module 304 of the in-ear utility device 301 may operate in conjunction with another ear-borne audio device (e.g. one in-ear utility device in a left ear and another in-ear utility device in a right ear), while in another embodiment an in-ear utility device 301 may operate independently. In yet another embodiment, at least one in-ear utility device 301 may operate in conjunction with a mobile computing device.

The in-ear utility device 301 may operate as a walkie-talkie device communicating with another ear-borne audio device operating in another ear of the user, with another device associated with the user, with another ear-borne audio device associated with another user, and/or with a third-party device. In some embodiments, a user of the in-ear utility device 301 might be able to communicate with another ear-borne audio device user using little more than just a whisper and at great distances.

The in-ear utility device 301 may also include functionality (e.g., the wireless communication module 304) to communicate bi-directionally via a long-range wireless network. In one embodiment, the long-range wireless network includes a cellular network. In another embodiment, the long-range wireless network includes a multimedia communications network. In another embodiment, the long-range wireless network includes wireless technologies such as Global System for Mobile Communications (GSM), Code Division Multiple Access-One (cdmaOne), Time Division Multiple Access (TDMA), PDC, Japan Digital Cellular (JDC), Universal Mobile Telecommunications System (UMTS), Code Division Multiple Access-2000 (cdma2000), and Digital Enhanced Cordless Telephony (DECT).

The wireless communications module 304 may be configured to communicate with a remote server or network. In one embodiment, the remote network is a cloud computing platform. As used herein, the term "remote computing device" or "mobile computing device" refers to anyone or all of cellular telephones, tablet computers, phablet computers, personal data assistants (PDAs), palm-top computers, notebook computers, laptop computers, personal computers, wireless electronic mail receivers and cellular telephone receivers (e.g., the Blackberry® and Treo® devices), multimedia Internet enabled cellular telephones (e.g., Blackberry Storm®), multimedia enabled smart phones (e.g., Android® and Apple iPhone®), and similar electronic devices that include a programmable processor, memory, a communication transceiver, and a display.

User Interface for Ear-Borne Audio Device

Sensors, and combinations of sensors 306a-306z, may also be used to provide a user interface function for an ear-borne audio device, such as the in-ear utility device 301. For example, an accelerometer 306a (or a G-force sensor) might activate when a user moves or taps his/her hand (or by the user shaking his/her head while wearing an ear-borne accelerometer in the ear-borne audio device) in a predetermined manner (e.g., taps of a certain force or intensity within a certain time frame or head nods of certain characteristics) that can be sensed by the accelerometer sensor 306a. Such an action could trigger the accelerometer sensor 306a such that additional commands might be received through additional actions such as further tapping or by head shaking.

For example, a user might tap his/her jaw, ear, check, neck, or another pre-designated location (e.g., via a predesignated single tap, double tap, or triple tap). This tapping action could trigger the accelerometer sensor 306a such that additional commands could also be received through additional taps. So, for example, once the G-force sensor 306a has been activated, then two more taps might activate recording of portions of an audio conversation in a loop, such as disclosed in FIGS. 1A and 1B.

The taps detected by the accelerometer 306a could be delivered to the processor 307 that may retrieve additional data 311 from the data storage component 309. The user's selection could be confirmed by appropriate auditory confirmation (e.g., confirmatory audio message) delivered through the speaker 308. The processor 307 could retrieve an appropriate confirmatory audio message 311 from the data storage component 309 and deliver it to the speaker 308.

Thus, the user could initiate a variety of audio recording commands using the tap-detection user interface. The user could use taps to engage the recording of a specific segment of a conversation, such as shown in FIG. 1A. Similarly, the user could use taps to engage the transmission of a recorded conversation to a remote device. The user could even use a series of taps to signal to a remote device specific actions to take with respect to a given audio file, according to an embodiment of the invention, such as disclosed in FIG. 1C.

Choices made by the user as well as possible command selections could be confirmed (e.g., spoken) to the user via the speaker 308 through the use of one or more confirmatory audio messages. Similar sensor configurations 306a-306z could also be used for user input functions, such as accelerometers, pulse rate, and temperature sensors.

Figure 3B:
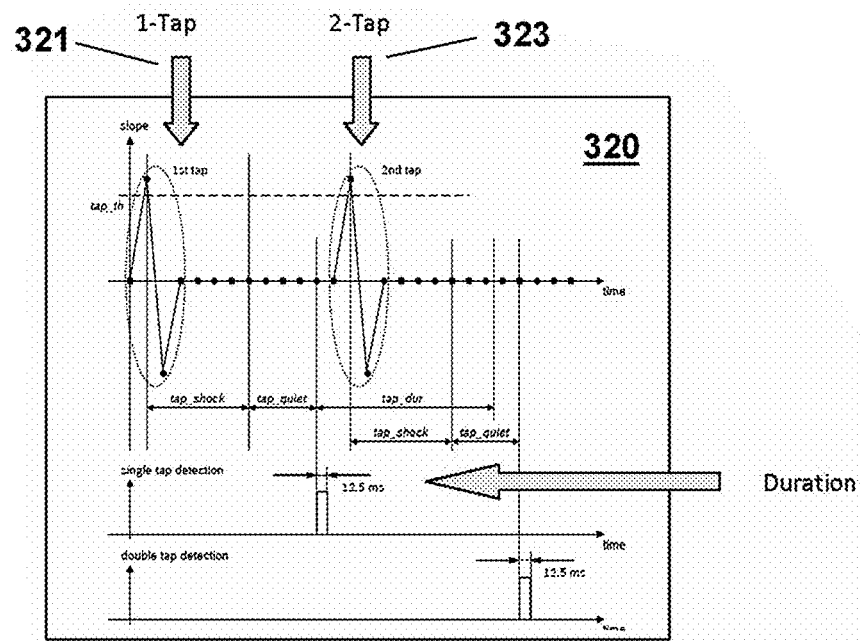
FIG. 3B provides a diagram 320 that shows a shock provided by a first tap 321 and the shock provided by a second tap 323 as measured by an accelerometer sensor 306a in an in-ear sound device 301, according to an embodiment of the invention.

FIG. 3B further describes implementation of a tap user interface and provides a diagram 320 that shows a shock (of a certain intensity) provided by a first tap 321 made by the user and the shock (of a similar intensity) provided by a second tap 323 made by the user as measured by an accelerometer sensor 306a in an in-ear sound device 301, according to an embodiment of the invention.

As shown in FIG. 3B, the taps 321, 323 have a tap intensity and a time duration within the predetermined range for a tap command recognizable by the in-ear utility device 301 and also include a predetermined quiet period between the taps 321, 323, according to an embodiment. The tap time duration and the quiet period represent a predetermined command convention established by the in-ear utility device 301 for recognizing taps as commands and not ignoring them as being merely random shocks. (Of course, the accelerometer 306a might record all shocks and report them to the processor 307 for another purpose.)

The accelerometer sensor 306a passes its data to the processor 307 shown in FIG. 3A, and the processor 307 compares the received data against relevant command data 311 (e.g., a predetermined pattern) stored in the data storage component 309. If the taps 321, 323 match an appropriate predetermined pattern (e.g., a pattern for predetermined action command or predetermined on/off command), then the processor 307 engages an appropriate action (e.g., sends an action signal), such as turning on/off the in-ear utility device 301 and/or performing another task (e.g., a predetermined action command).

For example, a representative tap sequence could an audio loop recording command that causes the processor 307 to begin recording sounds received by the microphone 303 in a loop that is stored in the data storage component 309. In some embodiments of the invention, the processor 307 may access a confirmatory audio message 311 stored in the data storage component 309 and play the confirmatory audio message through the speaker 308 before engaging any action as a means for determining that the user's tap and/or head nod command has been properly interpreted by the processor 307.

The accelerometer sensor 306a might communicate tap data to the processor 307 using inter-integrated circuit (I2C) communications, according to an embodiment of the invention. I2C is typically a multi-master, multi-slave, single-ended, serial computer bus that is typically used for attaching lower-speed peripheral integrated circuits (e.g., the accelerometer sensor 306a) to processors and microcontrollers, such as the processor 307. Such communications use binary code with a unique address through one programmed input/output (PIO). PIO is a method of transferring data between a CPU (e.g., the processor 307) and a peripheral (e.g., the accelerometer 306a). Other electric components and sensors 306a-306z of the in-ear utility device 301 may also use I2C for internal communications, according to an embodiment of invention.

A user interface for the electronic component package 302 shown in FIG. 3A, including the sensors 306a-306z, could also be provided to the user via the wireless communications module 304 and an external device, such as a mobile phone or a computer, according to an embodiment of the invention. A voice command user interface could also be provided via the microphone 303 and the processor 307, according to an embodiment of the invention. A voice command user interface could also be provided via the voice recognition chip 314 applied in combination with the microphone 303 with additional data 311 from the data storage component 309 and the processor 307, as well as hybrid user interfaces that combine the tap user interface discussed above with a user interface hosted on a visual device, such as a smartphone. An ordinary artisan should understand how to configure these various user interfaces.

The user interface could be provided on a remote device (e.g., a smartphone) with a subset of commands provided by an audio interface in the in-ear utility device 301. So, for example, commands such as "record conversation" could be engaged through the tap user interface with more complicated tasks, such as "make transcript of recording," coming from a graphical user interface on a remote device (e.g., a smartphone).

Sensors and Sensor Arrays

In embodiments, the in-ear utility device 301 may include one or more sensors 306a-306z configured to detect and/or measure various phenomena. In one embodiment, the in-ear utility device 301 may include one or more sensors 306a-306z configured to detect a physiological parameter of the user.

Figure 4:
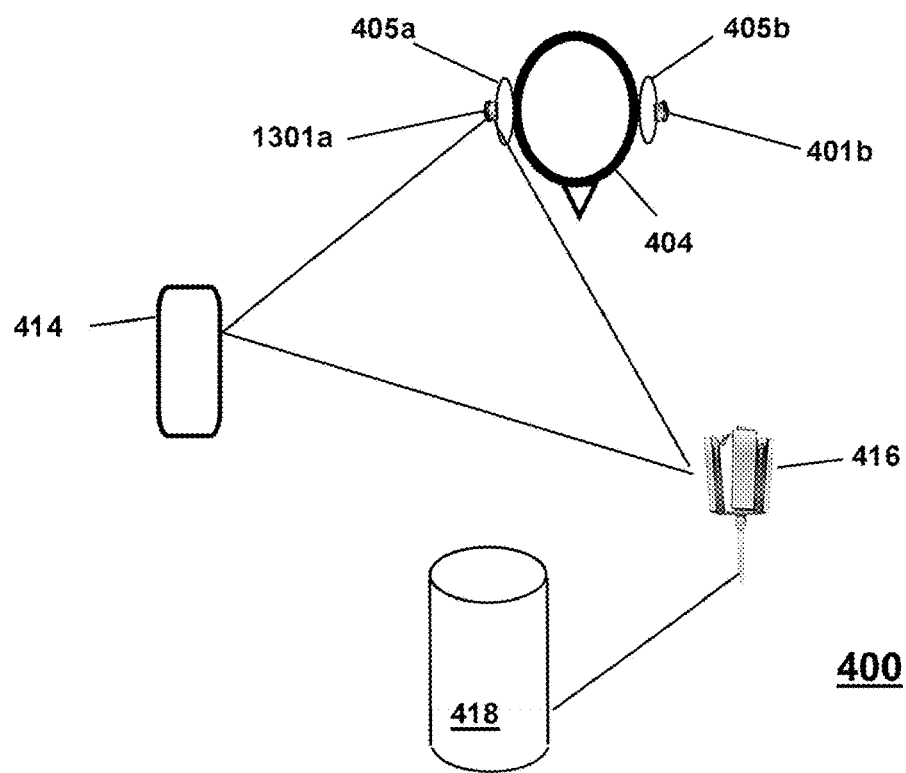
FIG. 4 illustrates a network 400 through which various processing tasks for ear-borne audio devices, such as in-ear utility devices 401a, 401b, can be distributed, according to an embodiment of the invention.

FIG. 4 illustrates a network 400 through which various processing tasks for ear-borne audio devices, such as in-ear utility devices 401a, 401b, can be distributed, according to an embodiment of the invention. Some processing tasks can be performed by the processors on the in-ear utility devices 401a, 401b; other processing tasks can be performed by a remote device, such as a smartphone 414, and other processing tasks can be performed by a powerful remote computing facility 418 (e.g., a cloud computing network), according to an embodiment of the invention. Thus, processing of the recording, analysis, and burst operations disclosed in FIGS. 1A-1D could be distributed throughout the network 400, according to an embodiment of the invention.

A user may wear in-ear utility devices 401a, 401b in each ear 405a, 405b. In some configurations, one of the in-ear utility devices (e.g., the in-ear utility device 401a) may serve as a master device between the two in-ear utility devices 401a, 401b, according to an embodiment of the invention. In other embodiments, each ear-borne audio device may operate independently and communicate independently with remote devices, such as the smartphone 414, and the remote computing facility 418.

The processor (e.g., the processor 307 shown in FIG. 3A) in an ear-borne audio device (e.g., the in-ear utility device 401a) may be programmed to have an understanding of tasks that it can complete itself and tasks that should be completed by a remote device. So, for example, if the user asks the in-ear utility device 401a, "What did my boss asked me to do in the recording?" the processor on the in-ear utility device 401a may recognize the utterance as an instruction. However, the processor may also recognize that this is a command that it cannot process alone and may need assistance from components such as those shown in FIG. 1C.

Consequently, the processor passes the command to either the smartphone 414 and/or the remote computing facility 418, according to an embodiment of the invention. The remote computing facility 418 may locate the requested information and return the answer to the in-ear utility device 405a, which then delivers the answer to the speaker of the in-ear utility device 405a. As previously discussed, the in-ear utility device 405a may communicate with the smartphone 414 using a protocol such as Bluetooth® and may communicate with the remote computing facility 418, possibly via a mobile base station 416, according to an embodiment of the invention. The in-ear utility device 401a may communicate to the mobile base station 416 using a protocol such as GSM, according to an embodiment of the invention.

Any number of tasks may be performed on the in-ear utility device 401a, and any number of tasks may be performed on the smartphone 414 and/or the remote computing facility 418, according to an embodiment of the invention. Tasks that may be most amenable to execution on the smartphone 414 and/or the remote computing facility 418 are tasks that require accessing large databases (e.g., restaurant guides) and/or need a more powerful computing device than can be provided by the in-ear utility device 401a.

Existing computerized applications can be enabled for operation on, or in conjunction with, the in-ear utility device 401a, according to an embodiment of the invention. Thus, a user may be able to access applications such as Skype translator, Google translator, WeChat, Facebook message, etc. via the in-ear utility device 401a, according to an embodiment of the invention. In some embodiments, a version of one of these existing applications may be tailored for operation on the in-ear utility device 401a, e.g., some portion of the application resides on the in-ear utility device 401a with other application tasks handled remotely. In other embodiments, the in-ear utility device 401a may simply engage a remote application.

Tasks that may be amenable to processing outside the in-ear utility device include voice authentication, artificial intelligence, speech recognition, and real-time translation. However, each of these tasks can also be performed entirely or partially on the in-ear utility device 401a. So, for example, the in-ear utility device 401a may be configured to perform some simple translation tasks while leaving more complicated tasks to processing outside the ear-borne audio device. Thus, the processor of the in-ear utility device 401a may be configured to understand which tasks it can perform itself and which tasks require assistance from another device, according to an embodiment of the invention.

Similarly, the processor (e.g., the processor 307 shown in FIG. 3A) may also be configured for notification response management, according to an embodiment of the invention. So, for example, the in-ear utility device 401a may be paired with the smartphone 414. The smartphone 414 may have calendar and/or alarm functions. The smartphone 414 may not filter its calendar/alarm messages (e.g., "The butcher turns 50 today."). However, the user of the in-ear utility device 401a may not want to hear from the speaker of the in-ear utility device 401a every calendar/alarm message provided by the smartphone 401a.

The processor on the in-ear utility device 401a may be configured by the user to play only calendar/alarm messages at or above a particular threshold, according to an embodiment of the invention. The calendar/alarm filter could be provided either on the smartphone 414 and/or on the in-ear utility device 401a, according to an embodiment of the invention. The calendar/alarm filter could also be provided by an external utility such as Google Calendar. The filter, could, for example, be an extension to Google Calendar or a similar function.

In operation, for example, the filter instructs the in-ear utility device 401a to play only high priority alarm messages. Alternatively, the filter may reside on the smartphone 414 or remote computing facility 418 and simply determine a subset of alarm messages to send to the in-ear utility device 401a, and the in-ear utility device 401a plays all the alarm messages of that subset that it receives. So, for example, "Job interview in 5 minutes" may have the highest priority, and the platform (e.g., the smartphone 414 and/or the remote computing facility 418) hosting the calendar/alarm filter may send this message to the in-ear utility device 401*a* for playing to the user while the platform decides not to send "Send flowers to Joe sometime today" to the in-ear utility device 401*a* such that the user won't hear this message via the in-ear utility device 401*a*, according to an embodiment of the invention.

The filtering function itself may be adjustable by the user and/or automatically by particular events, according to an embodiment of the invention. For example, as previously discussed, the in-ear utility device 401*a* may include a driver safety application. If the in-ear utility device 401*a* (or a related external system) becomes aware that the user is driving an automobile, then the calendar/alarm function may automatically engage (or be engaged by an external system in the automobile itself) to thwart the playing of all calendar/alarm messages and/or such calendar/alarm messages not at or above a high threshold, according to an embodiment of the invention.

In addition, the processor on the in-ear utility device 401*a* may also be configured not to play calendar/alarm messages when the in-ear utility device 401*a* is aware that the user is speaking, according to an embodiment of the invention. The in-ear utility device 401*a* may then schedule replaying of the calendar/alarm message after the passage of a predetermined amount of time, according to an embodiment of the invention. As previously discussed, the microphones on the in-ear utility device 401*a* may be configured to listen to the user's acoustic environment.

Similarly, as mentioned above, existing applications (e.g., WeChat) may be enabled for operation on the in-ear utility device 401*a*. Once these applications have been enabled, the filtering function described above may also be applied to notifications provided by these applications as well, according to an embodiment of the invention. Thus, the filter in conjunction with the application can determine when, where, and how notifications from these applications are delivered to the user. In other words, not all notifications may be provided to the user through the speaker of the in-ear utility device 401*a* residing in the user's ear 405*a*, according to an embodiment of the invention.

Figure 5:
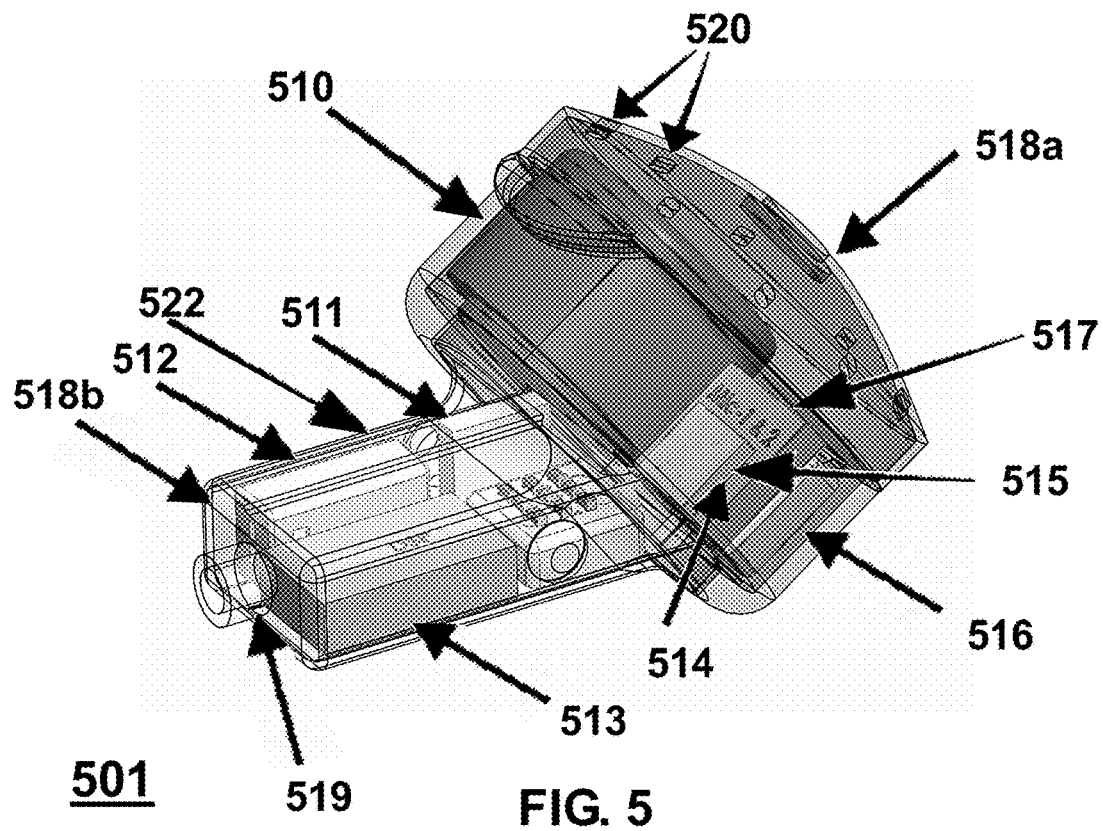
FIG. 5 illustrates a type of ear-borne device, an in-ear utility device 501 with its deformable outer covering seal removed, according to an embodiment of the invention.

FIG. 5 illustrates a type of ear-borne audio device, an in-ear utility device 501 with its deformable outer covering seal removed, according to an embodiment of the invention. The in-ear utility device 302 shown in FIG. 3A may include a deformable seal for the portion of the in-ear utility device 302 (e.g., an in-ear portion 518*b* for the in-ear utility device 501) that enters the user's ear.

The in-ear utility device 501 comprises an electronic components package 522 that includes a battery 510, a power booster 511, a communications module (e.g., transceiver) 512, a DSP chip 513, a first microphone 514, a second microphone 515, a voice recognition chip 516, and a noise cancellation chip 517 that provides noise cancellation for the first microphone 514 and/or the second microphone 515, and a speaker 519, according to an embodiment of the invention.

The first microphone 514 may deliver sound to the speaker 519. The first microphone 514 may be in electronic and/or mechanical communication with the speaker 519. Sound/vibrations picked up by the first microphone 514 may be transmitted to the speaker 519 (directly and/or after various forms of signal processing have been applied to improve the quality of the signal). In some embodiments, the sound/vibrations detected by the first microphone 514 may be amplified via an amplifier, such as the amplifier 305 shown in FIG. 3A, and transmitted to the speaker 519. In some embodiments, the amplifier operates in conjunction with the digital signal processing (DSP) 513.

The microphones 514, 515 may provide audio signals to a processor (such as the processor 307 shown in FIG. 3A) that engages the recording of received audio data, allowing implementation of the recording processes disclosed in FIGS. 1A and 1B, according to an embodiment of the invention.

The microphones 514, 515 can be used for amplification for the hearing impaired. Various embodiments of the in-ear sound device 501 can be configured to determine which sound sources the user and/or an application 311 run by the processor (e.g., the processor 307 shown in FIG. 3A) wants to amplify. If the sounds to be amplified are all sounds in the ear-borne audio device's environment, then it makes sense to amplify the signal from the ambient noise microphone 515. If the in-ear utility device 501 is configured to amplify the sound from the person(s) to whom the user of the in-ear sound utility device 501 are talking to, then the in-ear utility device 501 would amplify the signal from the voice microphone 514 since it will be more focused on picking up sounds from the direction that the wearer of the in-ear utility device 501 is facing. This process works well regardless of whether the in-ear utility device 501 is trying to perform noise cancellation based on the ambient microphone 515. The in-ear utility device 501 can have multiple modes for directional amplification such that the in-ear utility device 501 can switch among them depending on the situation. The user of the in-ear utility device 501 may have an actuator that allows the user to switch between modes. The actuator may be engaged by the tap sensor user interface discussed herein and/or by a visual user interface on a host device, according to an embodiment of the invention. The actuator may comprise a user-selectable actuator that could be applied to many embodiments of the invention.

In some embodiments of the invention, the distance between the speaker 519 and microphone ports 520 may be at a distance from 15 mm to 5 cm. The distance may need to be adjusted to avoid feedback, depending on the specific components that are used. As a general matter, the greater the distance between the microphone ports 520 and the speaker 519, the lower likelihood of feedback between the microphone ports 520 and the speaker 519.

The power booster 511 supplies additional electrical potential (e.g., 1.4 volts) in order to boost (or amplify) to a higher voltage (e.g., 3 volts) the voltage provided by the battery 510 to supply power to components of the in-ear utility device 501 that require higher voltage to operate properly, according to an embodiment of the invention. As mentioned, power demands for embodiments of the ear-borne audio device may operate at higher power than a conventional hearing aid.

Voice Recognition and Ambient Sound

The first microphone 514 may focus on picking up the voice of the user more strongly than the ambient sound microphone 515 while the second microphone 515 may be focused on detecting ambient sound, according to an embodiment of the invention. One or more voice focused ports for receiving sounds input to the first microphone 514 may reside in a number of locations on the in-ear utility device 501, such a voice focused port 612 shown in FIG. 6A.

The voice recognition chip 516 may be configured to perform operations to distinguish the user's voice from ambient noise. The voice recognition chip 516 may receive sound signals from the first microphone 514, determine whether the sound signals represent the user's voice, activate the speaker 519 when the sound signals represent meaningful sound, and filter the sounds delivered to the speaker 519 when the sound signals do not represent meaningful sound.

The voice recognition chip 516 may receive inputs from the first microphone 514 and/or the second microphone 515, according to an embodiment of the invention. As an alternative, the in-ear utility device 501 may include a processor, such as the processor 307 shown in FIG. 3A that has been configured to execute a program 311 that performs operations to distinguish meaningful sound from ambient noise.

The voice recognition chip 516 (or similar functionality) may be configured to engage a phone call, such as answering an incoming phone call and/or placing a new call, according to an embodiment of the invention. The voice recognition chip 516 may also provide a capability for disengaging a phone call as well. Similarly, the accelerometer sensor 306*a* in conjunction with the tap user interface may be used to provide a capability for engaging/disengaging telephony functions, according to an embodiment of the invention. Telephony functions can also be engaged through an application on a remote device, such as a smartphone, according to an embodiment of the invention.

The electronics components package 522 may include other combinations of electronic components and additional components as discussed elsewhere herein, according to an embodiment of the invention. For example, the in-ear utility device 501 may also include a processor and a memory device such as the processor 307 and the data storage device 309, shown in FIG. 3A, and/or including one or more sensors 306*a*-306*z*, according to an embodiment of the invention. Among other things, the processor using data and instructions from the data storage device may perform noise cancellation and/or various enhancement techniques.

Figure 6A:
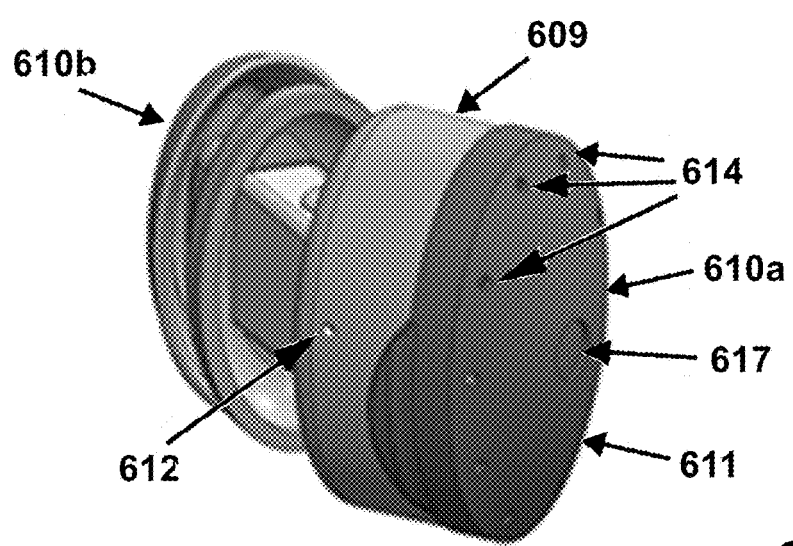
FIGS. 6A-6B illustrate an in-ear utility device 601 inserted into an ear canal 615, according to an embodiment of the invention.
Figure 6B:
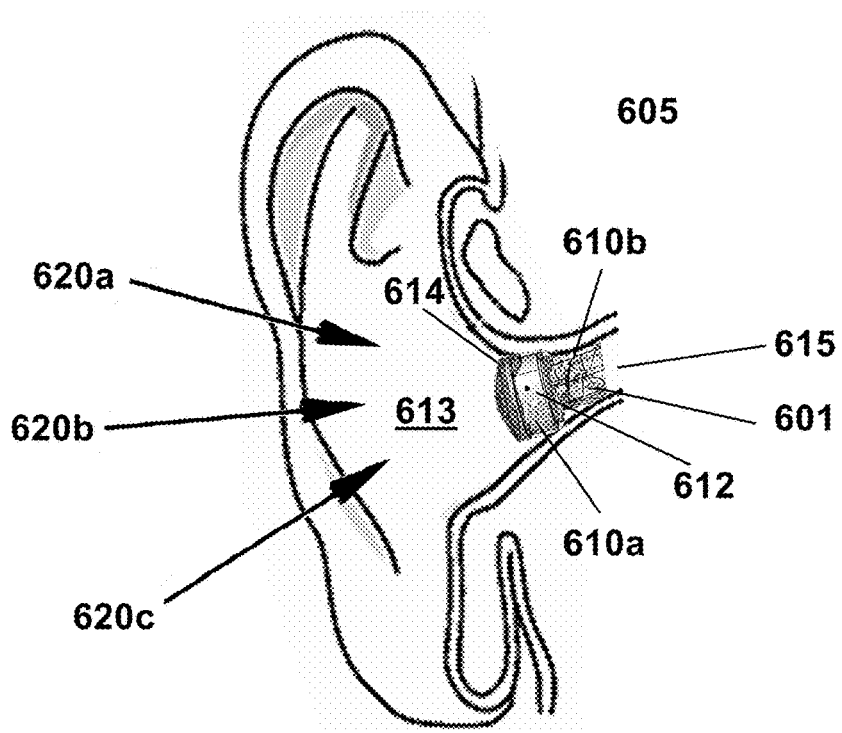

As shown in FIGS. 6A-6B, one or more voice focused pots) 612 may channel detected sounds to a microphone focused on picking up the voice of the user more strongly than the ambient sound (e.g., the first microphone 514 shown in FIG. 5), according to an embodiment of the invention. These ports may facilitate the recording of conversations, such as disclosed in FIG. 1A.

The voice focused pots) 612 may reside on a side 609 of a cap end 611 of the in-ear utility device 601, according to an embodiment of the invention. The side 609 resides on an out-of-ear portion 610*a* of the in-ear utility device 601 that corresponds to out-of-ear portion 518*a* shown in FIG. 5. The in-ear utility device 601 is shaped such that when inserted into the user's ear canal 615 the voice focused port 612 will rest facing outward or forward in alignment with the user's eyes and mouth, as shown in FIG. 6B.

As previously discussed, in some embodiments the port 612 may be located inside the user's ear canal 615. FIG. 6B illustrates an in-ear utility device 601 inserted into an ear canal 615, according to an embodiment of the invention.

Voice recognition using the voice focused port 612 takes advantage of the microphone input port location being a fixed distance from the user's voice when the user is speaking. As shown in FIG. 6B, a second portion 610*b* of the in-ear utility device 601 (shown here only partially) is inserted into the user's ear canal 615 during normal operation. The first portion 610*a* of the in-ear utility device 601 having the voice focused port 612 remains outside the user's ear during operation but fixed in position because of the anchoring of the second portion 610*b* in the user's ear canal 615, according to an embodiment of the invention.

A fixed distance from the voice focused port 612 to the user's mouth 607 is useful because this fixed distance helps in setting the spectral and intensity profile of the user's voice for voice recognition purposes and therefore easier to pick out the user's voice from the incoming audio signal. Therefore, the fixed distance can improve the signal-to-noise ratio even in noisy environments.

Changing the distance between the microphone input port and the input signal affects the signal-to-noise ratio of the captured sound. Moreover, in a reverberant room, the distance between the speaker and the microphone could also affect the spectrogram of the recorded sound. Therefore, the fact that the in-ear utility device 601 is always recording the user's voice from a fixed distance makes the speech recognition easier and more accurate.

The in-ear utility device 601 shown in FIG. 6A has been configured for insertion into a user's left ear. This orientation means that the voice focused port 612 shown in FIG. 6A would face the user's mouth in normal operation, as shown in FIG. 6B. Thus, the voice focused port 612 would be appropriate for the in-ear utility device 601*b* shown in FIG. 6C.

The in-ear utility device 601 includes at least one ambient noise port 614, according to an embodiment of the invention. The in-ear utility device 601 may even include multiple ambient noise ports 614 (e.g., more than 10 such ports), according to an embodiment of the invention. The ambient noise ports 614 may be disposed around the exterior of the cap end 611 of the in-ear utility device 601 in a 360 degree pattern from the center point 617 of the cap end 611 on the outer surface of the in-ear utility device 601, according to an embodiment of the invention.

Among other things, the ambient noise port(s) 614 can support the voice recognition process by helping cancel out unwanted frequencies in the manner previously discussed. The ambient noise port(s) 614 may provide input to a microphone, such as the second microphone 515 shown in FIG. 5, according to an embodiment of the invention. The ambient noise port(s) 614 aid in calibrating the direction of sounds 620*a*-620*c* entering the in-ear utility device 601 via the pinna 613 of the ear 605. The pinna 613, or conchae bowl, provides a horn, of sorts, that aids in naturally focusing the sounds 620*a*-620*c*. The location of the ambient noise port(s) 614 has been selected to facilitate its operation by advantageously exploiting the natural focusing and amplification provide by the pinna 613.

Due to the placement of the microphone ports 612, 614 the signal from the user's voice is amplified much more than ambient sound, especially given the anatomy of the human ear to which the in-ear utility device makes advantageous use of. The pinna 613 has evolved as a tool for enhancing and amplifying sounds having a pitch that is typical for a human voice while leaving most other frequencies untouched. Moreover, sounds which are coming from the front of the user sound louder than sounds coming behind the user due, in part, to the construction of the ear. Thus, the in-ear sound device 601 has been developed to advantageously apply the natural condition of the ear 605 and the pinna 613. This gives the in-ear sound device 601 the added benefit that the sound from the user's voice sound much louder than any sounds coming from behind the user, among other things.

Embodiments of the in-ear utility device 601 may employ directional microphones. Thus, the microphone 514 shown in FIG. 5 and the second microphone 515 shown in FIG. 5 may be directional microphones. As discussed with regard to the microphone ports 612, 614, one of these ports, the voice focused port 612 is specifically aimed at the user, and the ambient noise port(s) 614 are aimed straight in the vicinity of the speaker. Depending on whether the in-ear utility device 601 wants to focus on the user's voice or the sounds coming to the user and the user's environment, the signals from each of the microphones 514, 515 can be subtracted from each other, and the signal from the microphone that is of interest can be amplified.

The fact that one of the microphone input ports is in the ear canal 615 allows for cues from the pinna 615 which can be applied for front/back localization by the processor (or combination of equipment performing the sound processing functions). Moreover, use of directional microphones may also help in front/back localization of the speaker of interest. In addition, using of the right in-ear utility device 605a and the left in-ear utility device 605b (discussed in FIG. 60) improves sound localization of right/left differentiation.

The microphone ports 612, 614 could be placed in a variety of locations on the in-ear utility device 601. The microphone ports 612, 614 could even be located inside the portion of the in-ear utility device 601 that resides in the user's ear canal 615. One microphone port, for example, could face inward to the user's ear canal, which facilitates determining when the user is speaking. The in-ear utility device 601 could even include a bone conduction microphone. In some embodiments of the invention, the ambient noise port(s) 614 could be replaced with a signal port.

The in-ear utility device 601 may communicate (e.g., via the communication module 304 shown in FIG. 3A) with a counterpart in-ear utility device (e.g., an in-ear utility device 601b in the left ear communicating with an in-ear utility device in the right ear 601a) to improve overall functionality. For example, the microphone(s) in the left ear in-ear utility device 601b may combine received sounds with the microphone(s) in the right ear in-ear utility device 601a. Inputs from these multiple microphones may improve overall noise cancellation for each in-ear utility device 601a, 601b.

Similarly, microphones in either or both of the in-ear utility devices 601a, 601b may be placed in different locations. Placing the microphones in different locations allows different sound signals to be received by the in-ear utility device 601, and these different signals may facilitate noise cancellation.

Using voice profiles (e.g., voice profiles 311 stored in the data storage component 309 shown in FIG. 3A), a processor in the in-ear utility device 601 (e.g., the processor 307 shown in FIG. 3A) can employ noise cancellation to identify a very specific sound in a haze of noise (e.g., picking a particular person out in a crowd). So, for example, assume a user of the in-ear utility device 601 attends a concert with his/her spouse. Assume further that the in-ear utility device 601 has a voice profile of the spouse. By applying the voice profile for the spouse (e.g., a voice profile 311 stored in the data storage component 309), the ear-borne audio device's noise cancellation process can use the voice profile as a filter to cancel sounds not fitting the voice profile and thereby allow the user to hear the spouse's voice at a greater distance in a noisy crowd than would be the case without the additional processing or with the unaided ear.

Voice profiles could take a number of different formats but typically include information regarding the tonality, cadence, and frequency response of the person associated with the voice profile. Creating such profiles are not a part of the invention herein; however, such voice profiles can be created by having a person record a small number of sentences and then analyzing the response to derive the essential characteristics of the person's voice. Embodiments of the in-ear utility device 601 could obtain and store a large number of voice profiles (e.g., in the storage device 309 shown in FIG. 3A). Voice profiles are one representative embodiment of an audio profile, which could be a similar profile for some sound (human, animal, machine, etc.) that is amenable to being used as a filter; thus, the voice profiles discussed herein are representative examples of audio profiles.

The enhancement of a speaker's voice can be performed in a number of ways. For example, from a spectrogram of a speech, the pitch range, intonational pattern, voice quality, dialectal traits of the speaker can be obtained. In other words, the characteristics of the speaker's voice or voice biometrics can be gleaned.

If the data storage component of the ear-borne audio device (e.g., the data storage component 309 shown in FIG. 3A) has a database of different people's voice profiles (e.g., based on voice biometrics), then the processor (e.g., the processor 307 shown in FIG. 3A) can identify a particular speaker in a speech sample. Once the speaker of interest is determined, then the incoming sound captured by the in-ear utility device 601 can be filtered by the characteristics of the speaker of interest and that received sound signal can be amplified under the direction of the processor and all other sounds can be filtered or diminished. Using statistical models of speech and noise, once the processor of in-ear utility device 601 knows the temporal and spectral characteristics of speech of interest, the processor can engage the filtering out of all other sounds.

Figure 6C:
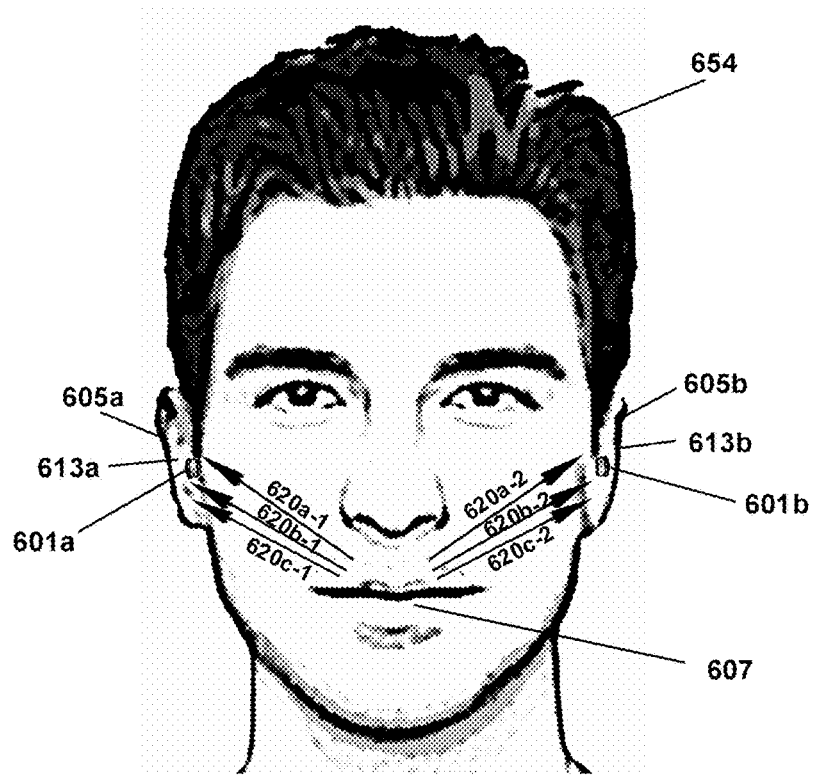
FIG. 6C illustrates a portion of the distal ends of two in-ear utility devices 601a, 601b in a single user's ears 605a, 605b in a head 654, according to an embodiment of the invention.

FIG. 6C illustrates a portion of the distal ends of two in-ear utility devices 601a, 601b in a single user's ears 605a, 605b in a head 654, according to an embodiment of the invention. FIG. 6C shows the right ear 605 shown in FIG. 6B and adds a left ear 605b.

The distal ends of the in-ear utility devices 601a, 601b provide a fixed distance from the user's mouth 607 since the in-ear utility devices 601a, 601b are anchored in the user's ear canals. As previously shown in FIG. 2 and FIG. 2B and FIGS. 6A-6B, the in-ear utility devices 601a, 601b are placed in the user's ear canal (e.g., the ear canal 215 shown in FIG. 2) during operation and are far less subject to movement once placed in the user's ears 605a, 605b.

Thus, the in-ear utility device 601 essentially resides at a fixed distance from the user's mouth 607. The fixed proximity to the user's mouth 607 coupled with the stability of the fixed distance simplifies calibration of the user's voice by the processor (e.g., the processor 307 shown in FIG. 3A) and simplifies recognition of the user's voice.

Sounds from the user's mouth 607 can be focused and amplified by allowing the in-ear utility devices 601a, 601b to advantageously apply the natural focusing and amplification by the pinna 613a, 613b of the user's ears 605a, 605b, as shown in FIG. 6B, especially the conchae bowl portion of the pinna. Here, sounds from the user's voice 620a-1, 620b-1, 620c-1 traveling to the user's right ear 605a can be collected and focused naturally by the pinna 613a in the user's right ear 605a before entering a microphone port on the in-ear utility device 601a. Similarly, sounds from the user's voice 620a-2, 620b-2, and 620c-2 traveling to the user's left ear 605b can be collected and focused naturally by the pinna 613b in the user's left ear 605b before entering a microphone port on the in-ear utility device 601b.

Figure 6D:
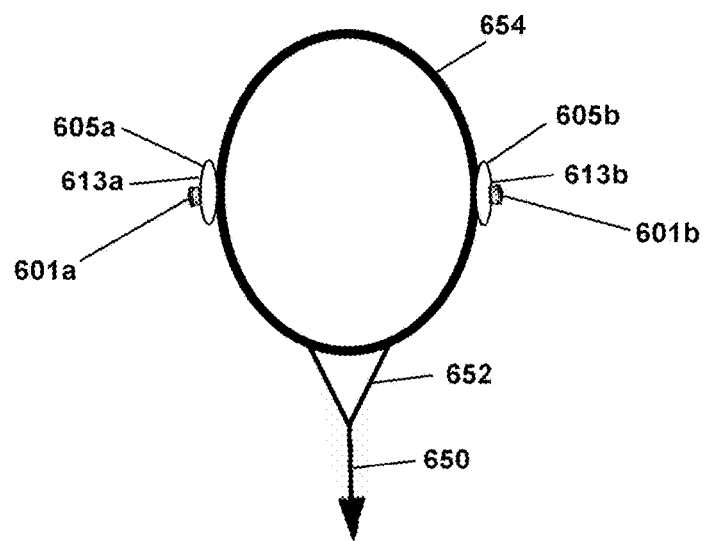
FIG. 6D illustrates a top-down view of in-ear sound devices 605a, 605b performing binaural beamforming for sounds in front of the head 654 shown in FIG. 6C, according to an embodiment of the invention.

FIG. 6D illustrates a top-down view of in-ear sound devices 605a, 605b performing binaural beamforming for sounds in front of the head 654 shown in FIG. 6C, according to an embodiment of the invention. When the in-ear sound devices 605a, 605b perform binaural beamforming, then the in-ear sound devices 605a, 605b will particularly focus on sounds in front of the user's head 654 and will in particular focus on sounds 650 essentially pointed to by the user's nose 652. Binaural beamforming may facilitate the recording of conversations, such as shown in FIGS. 1A and 1B, according to an embodiment of the invention.

The in-ear sound device 605*a* and the in-ear sound device 605*b* may be paired with each other, according to an embodiment of the invention. One of the in-ear sound devices may serve as a master device while the other device serves as a slave device. Microphone inputs from the in-ear sound devices 605*a*, 605*b* can be combined (e.g., in the master in-ear sound device) so that signal processing (e.g., using DSP 312 shown in FIG. 3A) can be performed on the microphone inputs so as to pick out a specific object (e.g., a person) that the user wants to concentrate on (e.g., via beamforming) and/or to improve signal-to-noise ratio in the combined signal, according to an embodiment of the invention. This process may facilitate higher quality recordings, such as the conversation recordings disclosed in FIGS. 1A and 1B.

When the right in-ear sound device 605*a* communicates its sound inputs with the left in-ear sound device 605*b*, binaural beamforming can be conducted to narrow the directional focus of the beam so that anything outside a region in an arc around the front of the user's head is attenuated, which improves the signal-to-noise ratio significantly and improves speech recognition, according to an embodiment of the invention.

Embodiments of the invention that perform beamforming may include at least two microphones per in-ear utility device 605*a*, 605*b*, e.g., two microphones for the right in-ear utility device 605*a* and two microphones for the left in-ear utility device 605*b*.

The ports for the microphones may typically be located at some distance away from each other in the in-ear utility device 605*a*, 605*b*. For example, the microphone port for ambient sound may be located on the opposite side of the ear-borne audio device from the voice focused port, such as the voice focused port 612 shown in FIG. 6A. In other words, in some embodiments of the invention, an outwardly facing ambient noise port (such as the ambient noise ports 614) might be replaced (or supplemented) by an ambient noise port at a location opposed to the voice focused port.

In some embodiments, it may be simpler to have two ambient noise ports (e.g., one outwardly facing and one opposed to the voice focused port) and two ambient noise microphones with a controller (e.g., the processor 307 shown in FIG. 3A) that simply switches one ambient microphone off and another on, depending on whether the ear-borne audio device is performing binaural beamforming or a similar function as opposed to performing a task optimized by an outwardly facing ambient microphone port. Of course, it would also be possible to use a smaller number of microphones and have some sort of physical device that opened and closed the various input ports depending upon their function.

Figure 7:
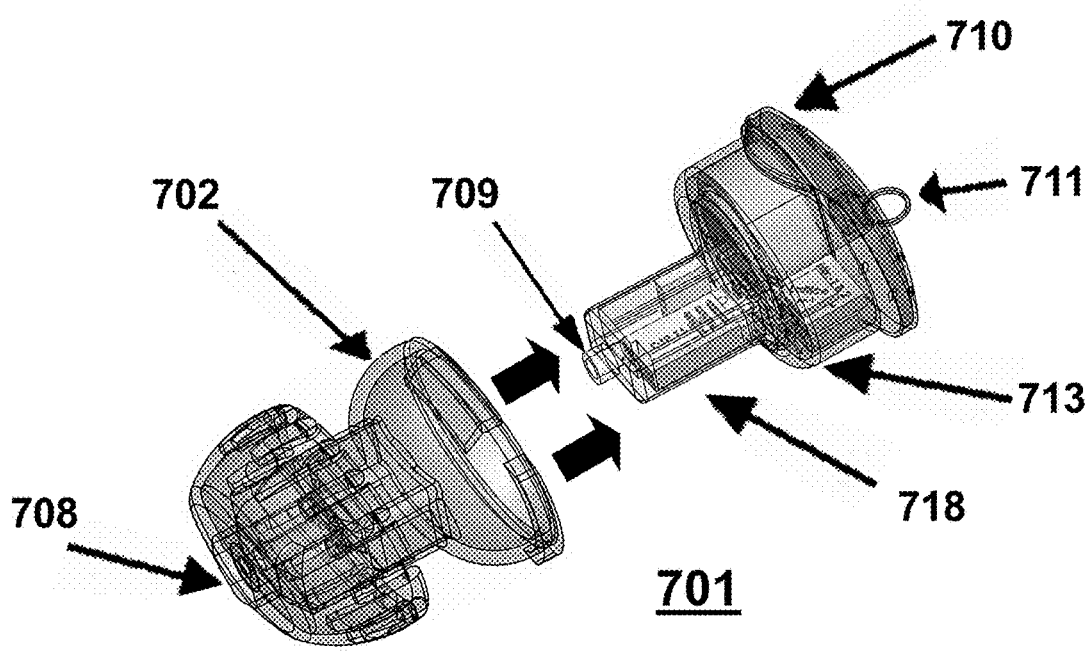
FIG. 7 illustrates an embodiment of an in-ear utility device 701 configured in a single, integrated body 718 rather than as a multi-pieced body as shown and described in FIG. 3A.

FIG. 7 illustrates an embodiment of an in-ear utility device 701 configured in a single, integrated body 718 rather than as a multi-pieced body as shown and described in FIG. 3-6. The integrated body 718 of the in-ear utility device 701 includes a microelectronics component package 713. The in-ear utility device 701 is shown in FIG. 7 with the body 718 separated from a seal 702 that typically covers at least a tip end of the body 718 when the in-ear utility device 701 is inserted into the user's ear canal (e.g., the ear canal 215 shown in FIG. 2).

Embodiments of the in-ear utility device 701 may fit completely inside the user's ear canal (e.g., the ear canal 215 shown in FIG. 2) with no part of the device extending outside the user's ear. The in-ear utility device 701 may include a ring 711 that facilitates removal of the device from the user's ear, e.g., the in-ear utility device 701 may be removed by latching the ring 711 with a small utility device having a matching hook. In an alternative embodiment, the body 718 may be made of a metallic substance such that the in-ear utility device 701 can be removed from the user's ear using a magnet.

Embodiments of the invention provide an in-ear utility device 701 covered, or partially covered, with a seal 702 that is comfortable to wear for a long period of time. The seal 702 can be produced in bulk eliminating the need for customizing the body 718 of the in-ear utility device 701. The external seal 702 deforms when the in-ear utility device 701 is inserted into a user's ear canal (e.g., the ear canal 215 shown in FIG. 2) without damaging the in-ear utility device 701 or causing harm to the user's ear (e.g., the ear 205 shown in FIG. 2).

The deformable seal 702 cushions the user's ear canal (e.g., the ear canal 215 shown in FIG. 2) from the material of the in-ear utility device's body 718, allowing the user to wear the in-ear utility device 701 for an extended period of time. The seal 702 allows the body 718 of the in-ear utility device 701 to be a "one size fits all" and conform to a broad range of ear canal anatomies, according to an embodiment of the invention. The seal 702 may be produced in several sizes (e.g., small, medium, larger) to accommodate differences in the size of human ear canals (e.g., the ear canal 215 shown in FIG. 2).

The electronic component package 713 is embedded in the body 718 of the in-ear utility device 701 and includes electronic circuitry allowing the in-ear utility device 701 to be inserted into the user's ear canal (e.g., the ear canal 215 shown in FIG. 2) without damaging the in-ear utility device 701 or causing injury to the user's ear, according to an embodiment of the invention.

The electronic component package 713 may include a speaker 709 disposed at the proximal tip 708 (e.g., the proximal tip 207 shown in FIG. 2) of the in-ear utility device 701. The speaker 709 is disposed at the proximal tip of the body 718, and when the seal 702 is fitted onto the in-ear utility device 701, the proximal tip 708 for the in-ear utility device 701 becomes the seal 702, according to an embodiment of the invention.

Embodiments of the in-ear utility device 701 have no wires protruding from the body 718 and no external behind-the-ear components associated with the in-ear utility device 701. The in-ear utility device 701 may be used by the hearing impaired population as well as the general public. Thus, the in-ear utility device 701 may be used for sound amplification and communication purposes as well as a number of additional purposes, such as those previously discussed herein.

The in-ear utility device 701 may also include a microphone port (e.g., the microphone port 612 shown in FIG. 6) to facilitate receipt of sounds into the in-ear utility device 701, according to an embodiment of the invention. The in-ear utility device 701 may have other ports, including ports for specific purposes, such as voice receipt/recognition and ambient noise receipt.

Various embodiments of the invention have been described in detail with reference to the accompanying drawings. References made to particular examples and implementations are for illustrative purposes, and are not intended to limit the scope of the invention or the claims.

The small form factor for the in-ear utility device may require the application of the smaller electronic components than the components typically found in other head-mounted devices, such as Bluetooth® devices, according to an embodiment of the invention. The circuit connecting the electronic components suggests the application of flexible circuitry. Flexible electronics, also known as flex circuits, provide a means for assembling electronic circuits by mounting electronic devices on flexible plastic substrates, such as polyimide, PEEK, or transparent conductive polyester film. Additionally, flex circuits can be screen printed silver circuits on polyester. Flexible electronic assemblies may be manufactured using identical components used for more rigid printed circuit boards, allowing the board to conform to a desired shape, and/or to flex during its use.

Many types of electronic components may be employed in the in-ear utility device, as discussed above. For example, in various embodiments, the ear-borne audio device may include microelectronics, nanoelectronics, micro-circuitry, nano-circuitry and combinations thereof.

In some embodiments, the dimensions of the in-ear utility device and/or the distance between the microphone and the speaker might be smaller and/or larger than the dimensions/distances provided above. For example, an embodiment of the invention may be prepared for users wearing helmets (e.g., as police officers, soldiers, football players, motorcyclists, and/or bicyclists). Similarly, an embodiment of the in-ear utility device made for security personnel, hunters, etc. might be extended in size to accommodate additional microphones, or higher fidelity microphones, and/or enhanced communications equipment.

It should be apparent to those skilled in the art that many more modifications of the ear-borne audio device besides those already described are possible without departing from the inventive concepts herein.

Embodiments of the ear-borne audio device may be configured for non-human ears, such as other primates, other mammals, and even non-mammalian species. Components of the electronics component package and the elastic body would be sized accordingly in these embodiments of the invention.

Headings and sub-headings provided herein have been provided as an assistance to the reader and are not meant to limit the scope of the invention disclosed herein. Headings and sub-headings are not intended to be the sole or exclusive location for the discussion of a particular topic.

While specific embodiments of the invention have been illustrated and described, it will be clear that the invention is not limited to these embodiments only. Embodiments of the invention discussed herein may have generally implied the use of materials from certain named equipment manufacturers; however, the invention may be adapted for use with equipment from other sources and manufacturers. Equipment used in conjunction with the invention may be configured to operate according to conventional protocols (e.g., Wi-Fi) and/or may be configured to operate according to specialized protocols. Numerous modifications, changes, variations, substitutions and equivalents will be apparent to those skilled in the art without departing from the spirit and scope of the invention.

It should be noted that while many embodiments of the invention described herein are drawn to a smart wireless ear-borne audio device, various configurations are deemed suitable and may employ various computing devices including servers, interfaces, systems, databases, agents, engines, controllers, or other types of computing devices operating individually or collectively. One should appreciate that any referenced computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed ear-borne audio device.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used herein, and unless the context dictates otherwise, the terms "ambient noise" and "ambient sound" have been used synonymously. Similarly, "sound" and "noise" have been used synonymous, except where the context shows a difference in meaning, e.g., "meaningful sound from mere noise." Likewise, "coupled to" is intended to include both direct coupling (in which two elements that are coupled to each other contact each other) and indirect coupling (in which at least one additional element is located between the two elements). Therefore, the terms "coupled to" and "coupled with" are used synonymously. The terms "coupled to" and "coupled with" are also used euphemistically to mean "communicatively coupled with" where two or more networked devices are able to send or receive data over a network.

We claim:

1. A wireless ear-borne audio system, comprising:
   a body having a first portion configured to connect to a user's ear and having a second portion that provides a speaker directed towards the user's ear, such that the user hears sounds from the speaker;
   a microphone attached to the body that detects ambient sounds near the user and converts the ambient sounds to a digital signal;
   a first processor configured to receive the digital signal from the microphone;
   a data repository configured to receive the digital signal from the first processor, wherein the first processor directs the data repository to store the received digital signal as a plurality of predetermined audio segments, each audio segment corresponding to a predetermined length of time; wherein the first processor operates storage of the received digital signal in a loop, such that the first processor directs the data repository to overwrite a previously stored predetermined audio segment of the plurality of predetermined audio segments when a number of predetermined audio segments reaches a predetermined audio segment number; and
   a user-engaged actuator that sends a signal to the first processor to play a first predetermined audio segment of the plurality of audio segments through the speaker, wherein the first processor locates the first predetermined audio segment and directs the speaker to play the first predetermined audio segment.

2. The wireless ear-borne audio system of claim 1 wherein after the first processor receives the digital signal from the microphone, the first processor analyzes the received digital signal to determine if it contains a user configurable engagement trigger, and if the first processor determines that the received digital signal contains the user configurable engagement trigger, then the first processor begins sending predetermined audio segments to the data repository.

3. The wireless ear-borne audio system of claim 2 wherein the user configurable engagement trigger comprises the phrase "now that's interesting."

4. The wireless ear-borne audio system of claim 2 wherein after the first processor receives the digital signal from microphone, the first processor analyzes the received digital signal to determine if it contains a user configurable disengagement trigger, and if the first processor determines that the received digital signal contains the user configurable disengagement trigger, then the first processor stops sending predetermined audio segments to the data repository.

5. The wireless ear-borne audio system of claim 1, further comprising:
   a communication module configured to transmit at least one predetermined audio segment to a remote analysis device; and
   a remote analysis device having a second processor that receives the at least one predetermined audio segment, analyzes the at least one predetermined audio segment to identify language in the at least one predetermined audio segment, convert the identified language into a transcript, and store the transcript in a remote analysis data repository.

6. The wireless ear-borne audio system of claim 5 wherein the first processor has been configured to perform natural language processing on the user's voice, and wherein the first processor receives an instruction from the user to transmit the at least one predetermined audio segment to the remote analysis device, wherein the first processor performs natural language processing on the received instruction, determines that the received instruction requests that the at least one predetermined audio segment be sent to the remote analysis device, wherein the first processor locates the at least one predetermined audio segment in the data repository and sends the at least one predetermined audio segment to the communication module with an instruction to transmit the at least one predetermined audio segment to the remote analysis device.

7. The wireless ear-borne audio system of claim 1 wherein the predetermined length of time is 30 seconds and wherein the predetermined audio segment number is 3.

8. The wireless ear-borne audio system of claim 1, further comprising:
   a communication module configured to transmit at least one predetermined audio segment to a remote analysis device; and
   a remote analysis device having a second processor that receives the at least one predetermined audio segment, analyzes the at least one predetermined audio segment to identify language in the at least one predetermined audio segment, convert the identified language into a text command for a first machine, and provide the text command to the communication module, wherein the communication module sends the text command to first machine for execution.

9. The wireless ear-borne audio system of claim 1, further comprising:
   a battery located in the body;
   a communication module located in the body and configured to receive a highly dense data transmission from a remote device,
   wherein data repository receives and stores the highly dense data transmission and sends a battery conservation message to the first processor,
   wherein the first processor receives the battery conservation message and instructs the battery to enter a lower power mode.

10. The wireless ear-borne audio system of claim 1 wherein the body has at least a portion shaped to fit into a user's ear canal, the body having a proximal end configured to reside in the user's ear canal at a distance no more than 12 millimeters away from the user's ear drum.

11. The wireless ear-borne audio system of claim 1, wherein the user-engaged actuator comprises:
   an accelerometer located in the body, the accelerometer configured to detect taps on the user's body and record tap data including tap intensity and tap duration, wherein the detected taps represent commands from the in-ear utility system user,
   wherein the first processor is configured to receive tap data from the accelerometer and determine if the received tap data matches a predetermined pattern for an audio segment replay command, wherein the first processor engages audio segment replay when the received tap data matches the predetermined audio segment replay command.

12. The wireless ear-borne audio system of claim 1, wherein the first processor comprises a CSR8670 chip.

13. The wireless ear-borne audio system of claim 1, wherein the user-engaged actuator comprises one of a user-accessible button on the ear-borne audio system and a graphical user interface on a smartphone configured to send instructions to the first processor.

14. A wireless ear-borne audio method, comprising:
   detecting ambient sounds near a user by a microphone that converts the ambient sounds to a digital signal, the microphone attached to a body having a first portion configured to connect to the user's ear;
   playing the digital signal to the user from a speaker, the speaker attached to the body;
   receiving the digital signal from the microphone by a first processor;
   receiving the digital signal in a data repository from the first processor, wherein the first processor directs the data repository to store the received digital signal as a plurality of predetermined audio segments, each audio segment corresponding to a predetermined length of time; wherein the first processor operates storage of the received digital signal in a loop, such that the first processor directs the data repository to overwrite a previously stored predetermined audio segment of the plurality of predetermined audio segments when a number of predetermined audio segments reaches a predetermined audio segment number; and
   sending a signal to the first processor by a user-engaged actuator to play a first predetermined audio segment of the plurality of audio segments through the speaker, wherein the first processor locates the first predetermined audio segment and directs the speaker to play the first predetermined audio segment.

15. The wireless ear-borne audio method of claim 14, wherein after the first processor receives the digital signal from the microphone, the method further comprising:
   analyzing by first processor the received digital signal to determine if it contains a user configurable engagement trigger and if the first processor determines that the received digital signal contains the user configurable engagement trigger, then sending predetermined audio segments by the first processor to the data repository.

16. The wireless ear-borne audio method of claim 14, further comprising:

transmitting at least one predetermined audio segment by a communication module to a remote analysis device; and receiving the at least one predetermined audio segment by the remote analysis device having a second processor that analyzes the at least one predetermined audio segment to identify language in the at least one predetermined audio segment, convert the identified language into a transcript, and store the transcript in a remote analysis data repository.

17. The wireless ear-borne audio method of claim 16 wherein the first processor has been configured to perform natural language processing on the user's voice, the method further comprising:

receiving an instruction by the first processor from the user to transmit the at least one predetermined audio segment to the remote analysis device, wherein the first processor performs natural language processing on the received instruction, determines that the received instruction requests that the at least one predetermined audio segment be sent to the remote analysis device, wherein the first processor locates the at least one predetermined audio segment in the data repository and sends the at least one predetermined audio segment to the communication module with an instruction to transmit the at least one predetermined audio segment to the remote analysis device.

18. The wireless ear-borne audio method of claim 14, further comprising:

transmitting at least one predetermined audio segment by a communication module to a remote analysis device; and receiving the at least one predetermined audio segment by the remote analysis device having a second processor that analyzes the at least one predetermined audio segment to identify language in the at least one predetermined audio segment, convert the identified language into a text command for a first machine, and provide the text command to the communication module, wherein the communication module sends the text command to first machine for execution.

19. The wireless ear-borne audio method of claim 1, further comprising:

receiving a highly dense data transmission from a remote device by a communication module located in the body;

storing the highly dense data transmission in a data repository, wherein after storing the highly dense data transmission the data repository sends a battery conservation message to the first processor;

wherein the first processor receives the battery conservation message and instructs a battery to enter a lower power mode by the first processor after receiving the battery conservation message.

20. The wireless ear-borne audio method of claim 1, wherein the user-engaged actuator comprises:

detecting taps on the user's body by an accelerometer located in the body that records tap data including tap intensity and tap duration, wherein the detected taps represent commands from the user, receiving tap data by the first processor from the accelerometer and determining by the first processor if the received tap data matches a predetermined pattern for an audio segment replay command, wherein the first processor engages audio segment replay when the received tap data matches the predetermined audio segment replay command.

* * * * *